US011722971B2

(12) United States Patent
Dutta et al.

(10) Patent No.: US 11,722,971 B2
(45) Date of Patent: Aug. 8, 2023

(54) TECHNIQUES FOR DETERMINING SIDELINK RESOURCES FOR MULTIPLE TRANSMISSION AND RECEPTION POINTS ENABLED USER EQUIPMENTS

(71) Applicant: QUALCOMM Incorporated, San Diego, CA (US)

(72) Inventors: Sourjya Dutta, San Diego, CA (US); Kapil Gulati, Belle Mead, NJ (US); Shuanshuan Wu, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/179,247

(22) Filed: Feb. 18, 2021

(65) Prior Publication Data

US 2021/0306961 A1 Sep. 30, 2021

Related U.S. Application Data

(60) Provisional application No. 63/001,206, filed on Mar. 27, 2020.

(51) Int. Cl.
*H04L 5/00* (2006.01)
*H04W 52/36* (2009.01)
(Continued)

(52) U.S. Cl.
CPC ............ *H04W 52/36* (2013.01); *H04J 99/00* (2022.08); *H04L 1/0003* (2013.01);
(Continued)

(58) Field of Classification Search
None
See application file for complete search history.

(56) References Cited

U.S. PATENT DOCUMENTS

2011/0255450 A1\* 10/2011 Wang ................ H04W 72/0493
370/310
2014/0372774 A1\* 12/2014 Li ....................... H04W 52/383
713/300

(Continued)

FOREIGN PATENT DOCUMENTS

CN 107889240 B \* 7/2020 ............ H04W 72/04
KR 20200099969 A \* 8/2020 ............ H04W 56/00
(Continued)

OTHER PUBLICATIONS

International Search Report and Written Opinion—PCT/US2021/018734—ISA/EPO—dated May 31, 2021.

*Primary Examiner* — Abdelillah Elmejjarmi
(74) *Attorney, Agent, or Firm* — Dalei Dong; Holland & Hart LLP

(57) ABSTRACT

Techniques for wireless communications are described. A user equipment (UE) may be configured with one or multiple transmission and reception points (TRPs). The UE may support sidelink communications, which may be referred to as vehicle-to-everything (V2X) communications systems, vehicle-to-vehicle (V2V) communications systems, and the like. The UE may provide improvements to resource determination for the sidelink communications by determining whether multiple peer UEs can be space-division multiplexed over time and frequency resources. To mitigate interference between the multiple peer UEs, the UE may transmit a power control request message to one or multiple peer UEs to adjust a transmit power level, and a receive a power control response message from the one or multiple peer UEs accepting or rejecting the transmit power level adjustment. As a result, the UE may experience efficient sidelink operations.

30 Claims, 17 Drawing Sheets

(51) Int. Cl.
*H04W 72/044* (2023.01)
*H04L 1/00* (2006.01)
*H04L 1/08* (2006.01)
*H04J 99/00* (2009.01)

(52) U.S. Cl.
CPC .............. *H04L 1/0009* (2013.01); *H04L 1/08* (2013.01); *H04L 5/0023* (2013.01); *H04W 72/044* (2013.01)

(56) References Cited

U.S. PATENT DOCUMENTS

| | | |
|---|---|---|
| 2015/0065120 A1 | 3/2015 | Kim |
| 2015/0078270 A1 | 3/2015 | Seo et al. |
| 2020/0107395 A1* | 4/2020 | Chen .................... H04W 84/20 |

FOREIGN PATENT DOCUMENTS

| | | |
|---|---|---|
| WO | WO-2020009986 A1 | 1/2020 |
| WO | WO-2020037687 A1 | 2/2020 |

\* cited by examiner

Single TRP UE

Multiple TRP UE

TECHNIQUES FOR DETERMINING SIDELINK RESOURCES FOR MULTIPLE TRANSMISSION AND RECEPTION POINTS ENABLED USER EQUIPMENTS

CROSS REFERENCE

The present Application for Patent claims the benefit of U.S. Provisional Patent Application No. 63/001,206 by DUTTA et al., entitled "TECHNIQUES FOR DETERMINING SIDELINK RESOURCES FOR MULTIPLE TRANSMISSION AND RECEPTION POINTS ENABLED USER EQUIPMENTS," filed Mar. 27, 2020, assigned to the assignee hereof, and which is hereby incorporated by reference in its entirety.

FIELD OF DISCLOSURE

The present disclosure, for example, relates to sidelink communications and techniques for determining sidelink resources for multiple transmission and reception points (TRP) enabled user equipment (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support sidelink communications between multiple communication devices. Examples of sidelink communications may include vehicle-based communications, which may also be referred to as vehicle-to-everything (V2X) communications systems, vehicle-to-vehicle (V2V) communications systems, and the like. As demand for sidelink communication efficiency increases, it may be desirable to provide improvements to sidelink communications to support higher reliability and low latency sidelink operations, among other examples.

SUMMARY

Various aspects of the described techniques relate to configuring a communication device, which may be otherwise known as user equipment (UE), with a single or multiple transmission and reception points (TRPs). The UE may be configured to provide improvement to resource determination for sidelink communication by configuring the UE to determine whether multiple peer UEs can be space-division multiplexed over time and frequency resources. To mitigate interference between the two or more peer UEs that are space-division multiplexed, the UE may request one or both of the peer UEs to adjust a transmit power. In some examples, the UE may additionally or alternatively request one or both of the peer UEs to beamform in a direction (and null some other direction). As a result, the UE may experience efficient sidelink operations by space-division multiplexing multiple peer UEs and communicating with the peer UEs over the multiple TRPs.

A method of sidelink communications at a UE is described. The method may include transmitting a first power control request message to a first peer UE using a first TRP of at least two TRPs associated with the UE and a second power control request message to a second peer UE using the first TRP or a second TRP of the at least two TRPs associated with the UE, receiving, in response to the transmitting, a first power control response message from the first peer UE using the first TRP of the UE and a second power control response message from the second peer UE using the first TRP or the second TRP of the UE, and determining time and frequency resources for the sidelink communications with the first peer UE and the second peer UE based on the received first power control response message and the received second power control response message.

An apparatus for sidelink communications is described. The apparatus may include a processor, memory coupled with the processor, and instructions stored in the memory. The instructions may be executable by the processor to cause the apparatus to transmit a first power control request message to a first peer apparatus using a first TRP of at least two TRPs associated with the apparatus and a second power control request message to a second peer apparatus using the first TRP or a second TRP of the at least two TRPs associated with the apparatus, receive, in response to the transmitting, a first power control response message from the first peer apparatus using the first TRP of the apparatus and a second power control response message from the second peer apparatus using the first TRP or the second TRP of the apparatus, and determine time and frequency resources for the sidelink communications with the first peer apparatus and the second peer apparatus based on the received first power control response message and the received second power control response message.

Another apparatus for sidelink communications is described. The apparatus may include means for transmitting a first power control request message to a first peer apparatus using a first TRP of at least two TRPs associated with the apparatus and a second power control request message to a second peer apparatus using the first TRP or a second TRP of the at least two TRPs associated with the apparatus, receiving, in response to the transmitting, a first power control response message from the first peer apparatus using the first TRP of the apparatus and a second power control response message from the second peer apparatus using the first TRP or the second TRP of the apparatus, and determining time and frequency resources for the sidelink communications with the first peer apparatus and the second peer apparatus based on the received first power control response message and the received second power control response message.

A non-transitory computer-readable medium storing code for sidelink communications at a UE is described. The code may include instructions executable by a processor to transmit a first power control request message to a first peer UE using a first TRP of at least two TRPs associated with the UE and a second power control request message to a second peer UE using the first TRP or a second TRP of the at least two TRPs associated with the UE, receive, in response to the transmitting, a first power control response message from the first peer UE using the first TRP of the UE and a second power control response message from the second peer UE using the first TRP or the second TRP of the UE, and determine time and frequency resources for the sidelink communications with the first peer UE and the second peer UE based on the received first power control response message and the received second power control response message.

In some examples of the method, apparatuses, and non-transitory computer-readable medium described herein, the first power control request message and the second power control request message include a transmit power parameter to adjust a transmit power value of the first peer UE and the second peer UE.

Some examples of the method, apparatuses, and non-transitory computer-readable medium described herein may further include operations, features, means, or instructions for determining to space-division multiplex the sidelink communications for the first peer UE and the second peer UE based on sidelink information associated with the first peer UE and the second peer UE, the sidelink information including an RSRP indicator or an RSRQ indicator, or both.

Some examples of the method, apparatuses, and non-transitory computer-readable medium described herein may further include operations, features, means, or instructions for multiplexing the sidelink communications for the first peer UE and the second peer UE over the determined time and frequency resources, where the multiplexing includes space-division multiplexing.

Some examples of the method, apparatuses, and non-transitory computer-readable medium described herein may further include operations, features, means, or instructions for determining a first transmit power value for the first peer UE and a second transmit power value for the second peer UE based on sidelink information associated with the first peer UE and the second peer UE, where the first transmit power value may be different from the second transmit power value.

In some examples of the method, apparatuses, and non-transitory computer-readable medium described herein, the first power control request message includes a first indication of the first transmit power value and the second power control request message includes a second indication of the second transmit power value.

Some examples of the method, apparatuses, and non-transitory computer-readable medium described herein may further include operations, features, means, or instructions for determining that the first peer UE accepts the first transmit power value and the second peer UE accepts the second transmit power value based on the first power control response message and the second power control response message, where determining the time and frequency resources for the sidelink communications with the first peer UE and the second peer UE may be based on the first peer UE accepting the first transmit power value and the second peer UE accepting the second transmit power value.

Some examples of the method, apparatuses, and non-transitory computer-readable medium described herein may further include operations, features, means, or instructions for transmitting first sidelink control information (SCI) to the first peer UE using the first TRP of the UE and second SCI to the second peer UE using the second TRP of the UE based on the first power control response message indicating the first peer UE accepting the first transmit power value and the second power control response message indicating the second peer UE accepting the second transmit power value.

Some examples of the method, apparatuses, and non-transitory computer-readable medium described herein may further include operations, features, means, or instructions for transmitting a first modulation and coding scheme (MCS) request message to the second peer UE using the second TRP of the UE based on the first power control response message indicating the first peer UE rejecting the first transmit power value and the second power control response message indicating the second peer UE accepting the second transmit power value, where the first MCS request message includes a first MCS restriction, and receiving a first MCS response message from the second peer UE using the second TRP of the UE based on the first MCS request message.

Some examples of the method, apparatuses, and non-transitory computer-readable medium described herein may further include operations, features, means, or instructions for transmitting a third power control request message to the first peer UE using the first TRP of the UE based on the first MCS response message indicating the second peer UE accepting the first MCS restriction, and receiving a third power control response message from the first peer UE using the first TRP of the UE based on the third power control request message.

In some examples of the method, apparatuses, and non-transitory computer-readable medium described herein, the third power control request message includes a third indication of a third transmit power value different from the first transmit power value.

Some examples of the method, apparatuses, and non-transitory computer-readable medium described herein may further include operations, features, means, or instructions for transmitting a second MCS request message to the second peer UE using the second TRP of the UE based on the third power control response message indicating the first peer UE rejecting the third transmit power value, where the second MCS request message includes a second MCS restriction different from the first MCS restriction, and receiving a second MCS response message from the second peer UE using the second TRP of the UE based on the second MCS request message.

Some examples of the method, apparatuses, and non-transitory computer-readable medium described herein may further include operations, features, means, or instructions for determining the first MCS restriction or the second MCS restriction, or both, based on the sidelink information associated with the first peer UE and the second peer UE.

Some examples of the method, apparatuses, and non-transitory computer-readable medium described herein may further include operations, features, means, or instructions for determining that the first peer UE accepts the first transmit power value and the second peer UE rejects the second transmit power value based on the first power control response message and the second power control response message, determining a third transmit power value different from the second transmit power value based on the second peer UE rejecting the second transmit power value, and retransmitting the second power control request message to the second peer UE using the second TRP of the UE based on the second power control response message indicating the second peer UE rejecting the second transmit power value, where the retransmitted second power control request message includes an indication of the third transmit power value.

In some examples of the method, apparatuses, and non-transitory computer-readable medium described herein, determining the third transmit power value may include operations, features, means, or instructions for updating the second transmit power value by a transmit power adjustment value.

Some examples of the method, apparatuses, and non-transitory computer-readable medium described herein may further include operations, features, means, or instructions for determining that the third transmit power value satisfies a threshold associated with the second peer UE, where retransmitting the second power control request message including the indication of the third transmit power value may be based on the third transmit power value satisfying the threshold associated with the second peer UE.

Some examples of the method, apparatuses, and non-transitory computer-readable medium described herein may further include operations, features, means, or instructions for determining an MCS restriction for the first peer UE based on receiving a third power control response message indicating the second peer UE accepting the third transmit power value.

Some examples of the method, apparatuses, and non-transitory computer-readable medium described herein may further include operations, features, means, or instructions for transmitting a MCS request message to the first peer UE using the first TRP of the UE, where the MCS request message includes an indication of the MCS restriction, receiving a MCS response message from the first peer UE using the first TRP of the UE based on the MCS request message, where determining the time and frequency resources for the sidelink communications with the first peer UE and the second peer UE may be based on the first peer UE accepting the MCS restriction and the second peer UE accepting the third transmit power value.

Some examples of the method, apparatuses, and non-transitory computer-readable medium described herein may further include operations, features, means, or instructions for transmitting a first beam modification request message to the first peer UE using the first TRP of the UE or a second beam modification request message to the second peer UE using the second TRP of the UE, or both, based on first capability information associated with the first peer UE or second capability information associated with the second peer UE, or both, and receiving a first beam modification response message from the first peer UE using the first TRP of the UE or a second beam modification response message from the second peer UE using the second TRP of the UE, or both, based on the first beam modification request message or the second beam modification request message, or both.

Some examples of the method, apparatuses, and non-transitory computer-readable medium described herein may further include operations, features, means, or instructions for transmitting the first power control request message or the second power control request message, or both, may be based on the first beam modification response message or the second beam modification response message, or both.

In some examples of the method, apparatuses, and non-transitory computer-readable medium described herein, the first beam modification request message or the second beam modification request message, or both, include an indication of a set of directional beams for the first peer UE or the second peer UE, or both, to activate for the sidelink communications.

In some examples of the method, apparatuses, and non-transitory computer-readable medium described herein, the first beam modification request message or the second beam modification request message, or both, include an indication of a set of directional beams for the first peer UE or the second peer UE, or both, to deactivate for the sidelink communications.

In some examples of the method, apparatuses, and non-transitory computer-readable medium described herein, the first beam modification request message or the second beam modification request message, or both, include an indication of a threshold transmit power value per directional beam for the first peer UE or the second peer UE, or both, for the sidelink communications.

In some examples of the method, apparatuses, and non-transitory computer-readable medium described herein, the first beam modification response message or the second beam modification response message, or both, include an indication of the first peer UE or the second peer UE, or both, accepting or rejecting a set of directional beams for the first peer UE or the second peer UE, or both, for the sidelink communications.

In some examples of the method, apparatuses, and non-transitory computer-readable medium described herein, the first TRP may be different from the second TRP.

In some examples of the method, apparatuses, and non-transitory computer-readable medium described herein, the determined time and frequency resources include same time and frequency resource blocks.

A method of sidelink communications at a UE is described. The method may include receiving a power control request message from a peer UE, the power control request message including an indication of a transmit power value for the UE, the peer UE having multiple TRPs, transmitting, based on the receiving, a power control response message from the peer UE, and transmitting the sidelink communications to the peer UE according to the transmit power value.

An apparatus for sidelink communications is described. The apparatus may include a processor, memory coupled with the processor, and instructions stored in the memory. The instructions may be executable by the processor to cause the apparatus to receive a power control request message from a peer apparatus, the power control request message including an indication of a transmit power value for the apparatus, the peer apparatus having multiple TRPs, transmit, based on the receiving, a power control response message from the peer apparatus, and transmit the sidelink communications to the peer UE according to the transmit power value.

Another apparatus for sidelink communications is described. The apparatus may include means for receiving a power control request message from a peer apparatus, the power control request message including an indication of a transmit power value for the apparatus, the peer apparatus having multiple TRPs, transmitting, based on the receiving, a power control response message from the peer apparatus, and transmitting the sidelink communications to the peer apparatus according to the transmit power value.

A non-transitory computer-readable medium storing code for sidelink communications at a UE is described. The code may include instructions executable by a processor to receive a power control request message from a peer UE, the power control request message including an indication of a transmit power value for the UE, the peer UE having multiple TRPs, transmit, based on the receiving, a power control response message from the peer UE, and transmit the sidelink communications to the peer UE according to the transmit power value.

Some examples of the method, apparatuses, and non-transitory computer-readable medium described herein may further include operations, features, means, or instructions for setting a transmit power level of the UE based on the transmit power value indicated in the power control request message.

Some examples of the method, apparatuses, and non-transitory computer-readable medium described herein may further include operations, features, means, or instructions for receiving SCI from the peer UE based on the power control response message indicating the UE accepting the transmit power value.

Some examples of the method, apparatuses, and non-transitory computer-readable medium described herein may further include operations, features, means, or instructions for receiving a MCS request message based on the power control response message indicating the UE rejecting the transmit power value, where the MCS request message includes a MCS restriction, and transmitting a MCS response message based on the MCS request message.

Some examples of the method, apparatuses, and non-transitory computer-readable medium described herein may further include operations, features, means, or instructions for receiving a beam modification request message based on capability information associated with the UE, and transmitting a beam modification response message based on the beam modification request message.

Some examples of the method, apparatuses, and non-transitory computer-readable medium described herein may further include operations, features, means, or instructions for receiving the power control request message may be based on the beam modification response message.

In some examples of the method, apparatuses, and non-transitory computer-readable medium described herein, the beam modification request message includes an indication of a set of directional beams for the UE to activate for the sidelink communications.

In some examples of the method, apparatuses, and non-transitory computer-readable medium described herein, the beam modification request message includes an indication of a set of directional beams for the UE to deactivate for the sidelink communications.

In some examples of the method, apparatuses, and non-transitory computer-readable medium described herein, the beam modification request message includes an indication of a threshold transmit power value associated with one or more directional beams for the UE to use for the sidelink communications.

In some examples of the method, apparatuses, and non-transitory computer-readable medium described herein, the beam modification response message includes an indication of the UE accepting or rejecting one or more directional beams for the UE to use for the sidelink communications.

DETAILED DESCRIPTION

Wireless communications systems may include multiple communication devices such as UEs and base stations, which may provide wireless communication services to the UEs. For example, such base stations may be next-generation NodeBs or giga-NodeBs (either of which may be referred to as a gNB) that may support multiple radio access technologies including 4G systems, such as LTE systems, as well as 5G systems, which may be referred to as NR systems. Some wireless communications systems may also support sidelink communications between multiple UEs. Examples of sidelink communications may include, but are not limited to, vehicle-to-everything (V2X) communications systems, vehicle-to-vehicle (V2V) communications systems, etc. As demand for communication efficiency and reliability increases, it may be desirable for wireless communications systems to provide improvements to sidelink communications to support higher reliability and low latency sidelink operations, among other examples.

A UE may establish a sidelink connection with one or multiple other UEs in a wireless communications system, for example, such as a V2X communications system. In some examples, the UE may support unicast communications, broadcast communications, or groupcast communications, or a combination thereof. To provide improvements to sidelink communications, the UE may be configured to determine whether multiple peer UEs can be space-division multiplexed over time and frequency resources. In some examples, to mitigate interference between the peer UEs, the UE may request the peer UEs to adjust a transmit power. In some examples, the UE may, additionally or alternatively, request the peer UEs to beamform in a direction depending on whether the peer UEs support beamforming. As a result, the UE may experience efficient sidelink operations by space-division multiplexing multiple peer UEs and communicating with the peer UEs over the multiple TRPs.

Aspects of the subject matter described in this disclosure may be implemented to realize one or more of the following potential improvements, among others. The techniques employed by UEs may provide benefits and enhancements to the operation of the UEs. For example, operations performed by the UEs may provide improvements to sidelink operations. In some examples, configuring the UEs to support space-division multiplexing multiple peer UEs for sidelink communications may support improvements to power consumption, spectral efficiency, and, in some examples, may promote enhanced efficiency for sidelink operations, among other benefits.

Aspects of the disclosure are initially described in the context of wireless communications systems. Aspects of the disclosure are further illustrated by and described with reference to apparatus diagrams, system diagrams, and flowcharts that relate to techniques for determining sidelink resources for multiple TRPs enabled UEs.

Figure 1:
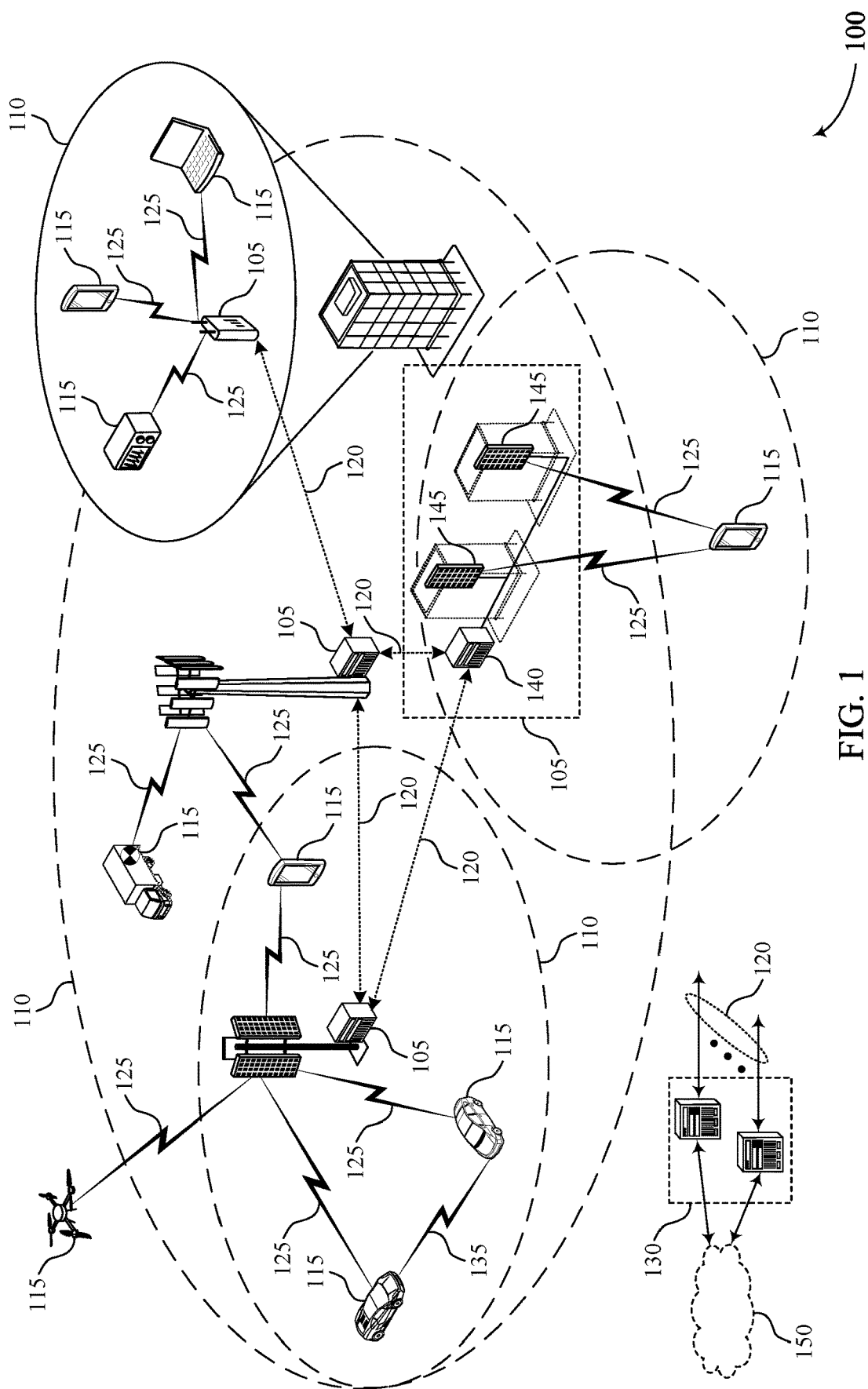
FIGS. 1 through 4 illustrate examples of wireless communications systems in accordance with various aspects of the present disclosure.

FIG. 1 illustrates an example of a wireless communications system 100 in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode). A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or radio frequency spectrum band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) radio frequency spectrum bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices. In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The UEs 115 may support sidelink communications with other devices, in a 5G wireless communications system. Sidelink communications may include vehicle-to-everything communications, vehicle-to-vehicle communications, or some combination of these. In some cases, these UEs 115 may have multiple TRPs (e.g., multiple transmit and receive chains). Each TRP may have a separate transmit and receive chain, thereby enabling these UEs 115 to provide sidelink communications to the other UEs 115 separately. These UEs 115 that are configured with multiple TRPs may provide improvements to resource determination for sidelink communication by configuring these UEs 115 to determine whether two or more peer UEs 115 can be space-division multiplexing over time and frequency resources (e.g., same resource blocks). To mitigate interference between the two or more peer UEs 115 that are space-division multiplexed, these UEs 115 may request one or both of the peer UEs 115 to change a transmit power level or provide an MCS restriction (e.g., an MCS threshold). In some implementations, these UEs 115 may additionally or alternatively request one or both of the peer UEs 115 to beamform in a direction (and null some other direction). As a result, these UEs 115 may experience efficient sidelink operations by space-division multiplexing multiple peer UEs 115 and communicating with the peer UEs 115 over the multiple TRPs.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more radio frequency spectrum bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using radio frequency spectrum bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical (PHY) layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Figure 2:
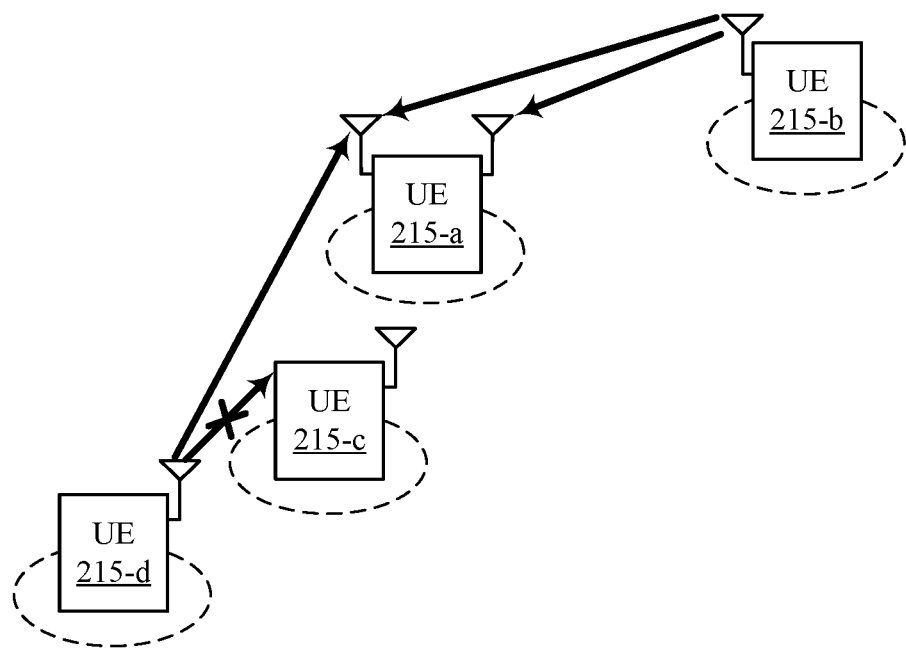
Figure 2:
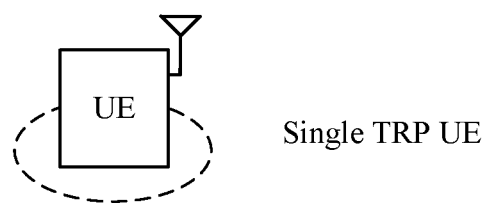
Figure 2:
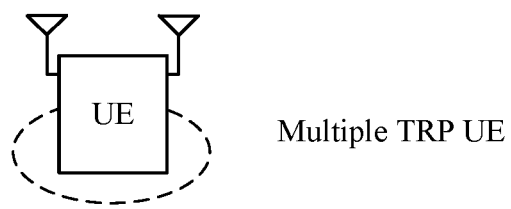

FIG. 2 illustrates an example of a wireless communications system 200 in accordance with various aspects of the present disclosure. The wireless communications system 200 may support multiple radio access technologies including 4G systems such as LTE systems, LTE-A systems, or LTE-A Pro systems, and 5G systems which may be referred to as NR systems. In some examples, the wireless communications system 200 may implement aspects of the wireless communications system 100. For example, the wireless communications system 200 may support sidelink communications between multiple UEs 215, which may be examples of corresponding devices described with reference to FIG. 1, respectively. Examples of sidelink communications may include V2V communications, V2X communications, and the like. The wireless communications system 200 may support improvements to power consumption and, in some examples, may promote higher reliability and lower latency sidelink communications, among other benefits.

One or more UEs 215, in the wireless communications system 200, may be configured with multiple antennas, which may be used to employ techniques such as transmit diversity, receive diversity, multiple-input multiple-output communications, or beamforming, or any combination thereof. The antennas of the one or more UEs 215 may be located within one or more antenna arrays or antenna panels, which may support multiple-input multiple-output operations or transmit or receive beamforming. The one or more UEs 215 may have an antenna array with a number of rows and columns of antenna ports that the one or more UEs 215 may use to support beamforming of sidelink communications. Likewise, the one or more UEs 215 may have one or more antenna arrays that may support various multiple-input multiple-output or beamforming operations for sidelink communications. Additionally or alternatively, an antenna panel may support radio frequency beamforming for a signal transmitted via one or more antenna ports. The one or more UEs 215 may thus be configured to support directional sidelink communications using one or multiple antennas.

One or more UEs 215, in the wireless communications system 200, may thereby be configured with a single TRP (e.g., a single transmit and receive chain) or multiple TRPs (e.g., multiple transmit and receive chains). In the example of FIG. 2, a UE 215-a may be configured with multiple TRPs, while UEs 215-b through 215-d may be configured with a single TRP. In the example of FIG. 2, the UE 215-a may be a vehicle (e.g., a sedan, a coupe) configured with a front antenna panel and a rear antenna panel for sidelink communications with one or more of the UE 215-b, the UE 215-b, and the UE 215-c in the wireless communications system 200 (e.g., a V2V communications system or a V2X communications system, or the like). In some examples, the UE 215-a may be a different type of vehicle, such as a truck or a trailer, and may be configured with multiple TRPs.

In some examples, there may be a separation between each TRP of the multiple TRPs associated with the UE 215-a. The separation between each TRP may be, for example, a threshold distance. With reference to the example when the UE 215-a is a vehicle (e.g., a sedan, a coupe) configured with a front antenna panel and a rear antenna panel, the front antenna panel and the rear antenna panel may, for example, be separated by 3 to 4 meters. With reference to the other example when the UE 215-a may be a different type of vehicle, such as a truck or a trailer (e.g., a 16-wheeler trailer), a front antenna panel and a rear antenna panel may have a greater separation, for example, such as 20 meters.

One or more ports associated with each TRP of the multiple TRPs associated with the UE 215-a may monitor a sidelink channel and sidelink environment differently. For example, each TRP of the multiple TRPs associated with the UE 215-a may monitor separate geographic locations but same or partial processing chain. For example, the UE 215-a may monitor a sidelink channel and receive sidelink communications from the UE 215-b via a first TRP associated with the UE 215-a and a second TRP associated with the UE 215-a. In some examples, the sidelink communications may be a reference signal. The UE 215-a may measure a reference signal received power (RSRP), or a reference signal received quality (RSRQ), or the like, associated with the sidelink communications (e.g., the reference signal). The RSRP and the RSRQ, and the like, may be referred to as sidelink information.

In some examples, the UE 215-a may determine that the sidelink communications received at the first TRP associated with the UE 215-a may have an RSRP below an RSRP threshold (e.g., RSRP<RSRP threshold), while the sidelink communications received at the second TRP associated with the UE 215-a may have an RSRP above the RSRP threshold (e.g., RSRP>RSRP threshold). In some examples, the UE 215-a may monitor a sidelink channel and receive sidelink communications from the UE 215-d via a first TRP associated with the UE 215-a, but may not receive the sidelink communications via the second TRP associated with the UE 215-a, due to a blockage (e.g., interference) between the UE 215-d and the second TRP associated with the UE 215-a. In the example of FIG. 2, the blockage may be due to the UE 215-c interfering in a transmission path between the UE 215-d and the second TRP associated with the UE 215-a. As such, each TRP of the multiple TRPs associated with the UE 215-a may monitor and collect different sidelink information, which may be used to provide improvements to resource determination for sidelink communications with the other UEs 215 (e.g., the UE 215-b, the UE 215-c, and the UE 215-d) in the wireless communications system 200.

Figure 3:
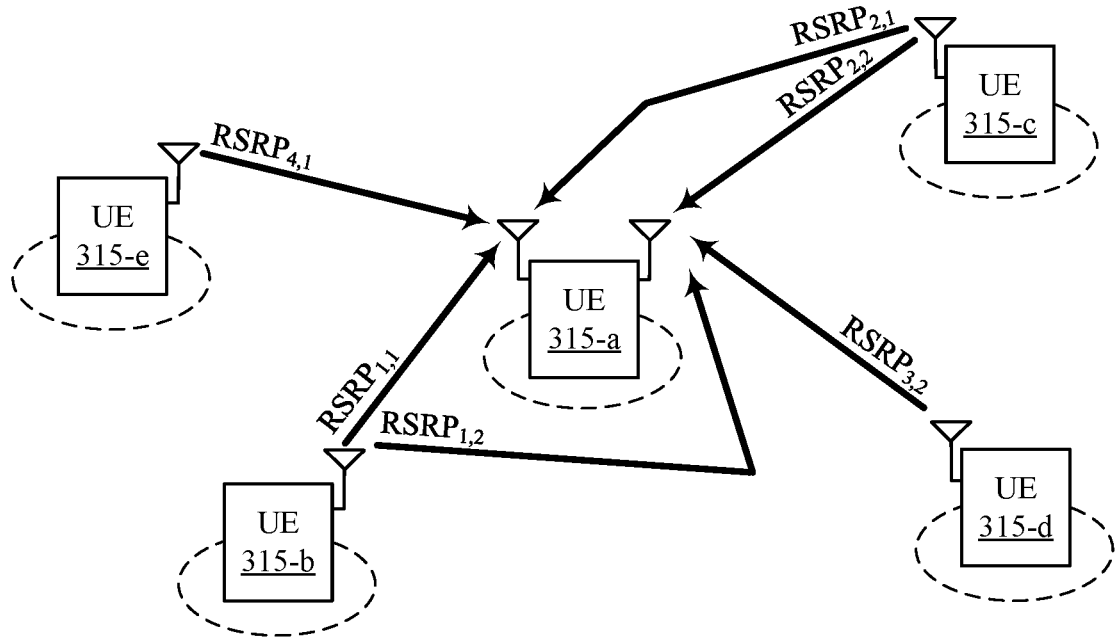
Figure 3:
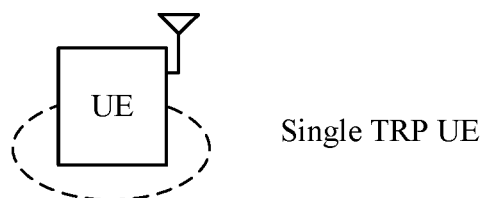
Figure 3:
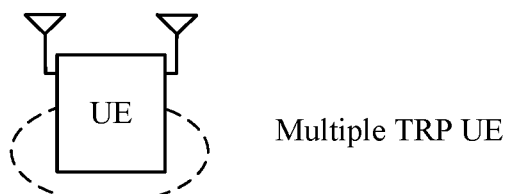

FIG. 3 illustrates an example of a wireless communications system 300 in accordance with various aspects of the present disclosure. The wireless communications system 300 may support multiple radio access technologies including 4G systems such as LTE systems, LTE-A systems, or LTE-A Pro systems, and 5G systems which may be referred to as NR systems. In some examples, the wireless communications system 300 may implement aspects of the wireless communications system 100 and the wireless communications system 200. For example, the wireless communications system 300 may support sidelink communications between multiple UEs 315, which may be examples of corresponding devices described with reference to FIGS. 1 and 2, respectively. Examples of sidelink communications may include V2V communications, V2X communications, and the like. The wireless communications system 300 may support improvements to power consumption and, in some examples, may promote higher reliability and lower latency sidelink communications, among other benefits.

One or more UEs 315, in the wireless communications system 300, may be configured with multiple antennas, which may be used to employ techniques such as transmit diversity, receive diversity, multiple-input multiple-output communications, or beamforming, or any combination thereof. The antennas of the one or more UEs 315 may be located within one or more antenna arrays or antenna panels, which may support multiple-input multiple-output operations or transmit or receive beamforming. The one or more UEs 315 may have an antenna array with a number of rows and columns of antenna ports that the one or more UEs 315 may use to support beamforming of sidelink communications. Likewise, the one or more UEs 315 may have one or more antenna arrays that may support various multiple-input multiple-output or beamforming operations for sidelink communications. Additionally or alternatively, an antenna panel may support radio frequency beamforming for a signal transmitted via one or more antenna ports. The one or more UEs 315 may thus be configured to support directional sidelink communications using one or multiple antennas.

One or more UEs 315, in the wireless communications system 300, may thereby be configured with a single TRP (e.g., a single transmit and receive chain) or multiple TRPs (e.g., multiple transmit and receive chains). In the example of FIG. 3, a UE 315-a may be configured with multiple TRPs, while UEs 315-b through 315-e may be configured with a single TRP. One or more of the UEs 315 may monitor one or more sidelink channels. In some examples, each UE 315 of the multiple UEs 315 may monitor one or more sidelink channels (e.g., channel sensing) during one or more time intervals. For example, each of the UE 315-*a* through 315-*e* may be configured to monitor one or more sidelink channels during one or more time intervals.

In the example of FIG. 3, the UE 315-*a* may monitor one or more sidelink channels and measure an RSRP associated with sidelink communications from the UE 315-*b* through the UE 315-*d*. The UE 315-*a* may measure an RSRP associated with sidelink communications from the UE 315-*b* through the UE 315-*d* on each TRP of the multiple TRPs. In some examples, the UE 315-*a* may measure, at a first TRP associated with the UE 315-*a*, an $RSRP_{1,1}$ associated with sidelink communications from the UE 315-*b* and measure, at a second TRP associated with the UE 315-*a*, an $RSRP_{1,2}$ associated with sidelink communications from the UE 315-*b*. In some other examples, the UE 315-*a* may measure, at a first TRP associated with the UE 315-*a*, an $RSRP_{2,1}$ associated with sidelink communications from the UE 315-*c* and measure, at a second TRP associated with the UE 315-*a*, an $RSRP_{2,2}$ associated with sidelink communications from the UE 315-*b*. Thus, both the first TRP and the second TRP associated with the UE 315-*a* may sense (e.g., receive sidelink communications) both the UE 315-*b* and the UE 315-*c*. A quality (e.g., a link quality) associated with a sidelink channel between the UE 315-*a* (e.g., each TRP associated with the UE 315-*a*) and the UE 315-*b*, as well as the UE 315-*c* may be different.

In some examples, the UE 315-*a* may measure an RSRP associated with sidelink communications from the UE 315-*b* through the UE 315-*d* on one TRP of the multiple TRPs. For example, the UE 315-*a* may measure, at a second TRP associated with the UE 315-*a*, an $RSRP_{3,2}$ associated with sidelink communications from the UE 315-*d*, but may not measure, at a first TRP associated with the UE 315-*a*, an RSRP associated with sidelink communications from the UE 315-*d* because the first TRP may not be in a transmission path of the sidelink communications from the UE 315-*d* or there may be a blockage between the first TRP associated with the UE 315-*a* and the UE 315-*d*. In some other examples, the UE 315-*a* may measure, at a first TRP associated with the UE 315-*a*, an $RSRP_{4,1}$ associated with sidelink communications from the UE 315-*e*. Similarly, the UE 315-*a* may not measure, at a second TRP associated with the UE 315-*a*, an RSRP associated with sidelink communications from the UE 315-*e* because the second TRP may not be in a transmission path of the sidelink communications from the UE 315-*e* or there may be a blockage between the second TRP associated with the UE 315-*a* and the UE 315-*e*. Thus, the UE 315-*a* may sense the UE 315-*d* via the second TRP associated with the UE 315-*a*, and the UE 315-*a* may sense the UE 315-*e* via the first TRP associated with the UE 315-*a*.

The UE 315-*a* may determine to coallocate resources both in a time domain and a frequency domain for sidelink communications with two or more of the UE 315-*b* through UE 315-*e* based in part on the measured RSRPs associated with the two or more of the UE 315-*b* through UE 315-*e*. For example, the UE 315-*a* may determine to coallocate the UE 315-*b* and the UE 315-*c* both in a time domain and a frequency domain based in part on that $RSRP_{2,1} < a*RSRP_{1,1}$ and $RSRP_{1,2} < a*RSRP_{2,2}$, where a is a weighting factor. In some examples, the UE 315-*a* may determine to coallocate the UE 315-*b* and the UE 315-*c* both orthogonally in a time domain and a frequency domain. For example, the UE 315-*a* may perform space-division multiplexing (also referred to as spatial-division multiplexing).

In some examples, the UE 315-*a* may determine to coallocate the UE 315-*b* and the UE 315-*c* both in a time domain and a frequency domain by controlling a transmit power for one or both of the UE 315-*b* and the UE 315-*c*. The UE 315-*a* may receive sidelink communications from the UE 315-*d* and the UE 315-*e* over same time and frequency resources. The UE 315-*a* may transmit a power control request message (e.g., RRC signaling) to the UE 315-*b* and the UE 315-*c*. The power control request message may indicate for the UE 315-*b* and the UE 315-*c* to transmit sidelink communications according to a transmit power level indicated in the power control request message or to adjust (e.g., reduce, increase) a transmit power level by a value (e.g., a transmit power level decrement value, a transmit power level increment value). The transmit power level may be such that $RSRP_{2,1} < a*RSRP_{1,1}$ and $RSRP_{1,2} < a*RSRP_{2,2}$. In some examples, the UE 315-*a* may also transmit an MCS request message indicating an MCS restriction (e.g., an MCS threshold), such that the UE 315-*b* and the UE 315-*c* may use any MCS that is equal to or below the MCS threshold.

Figure 4:
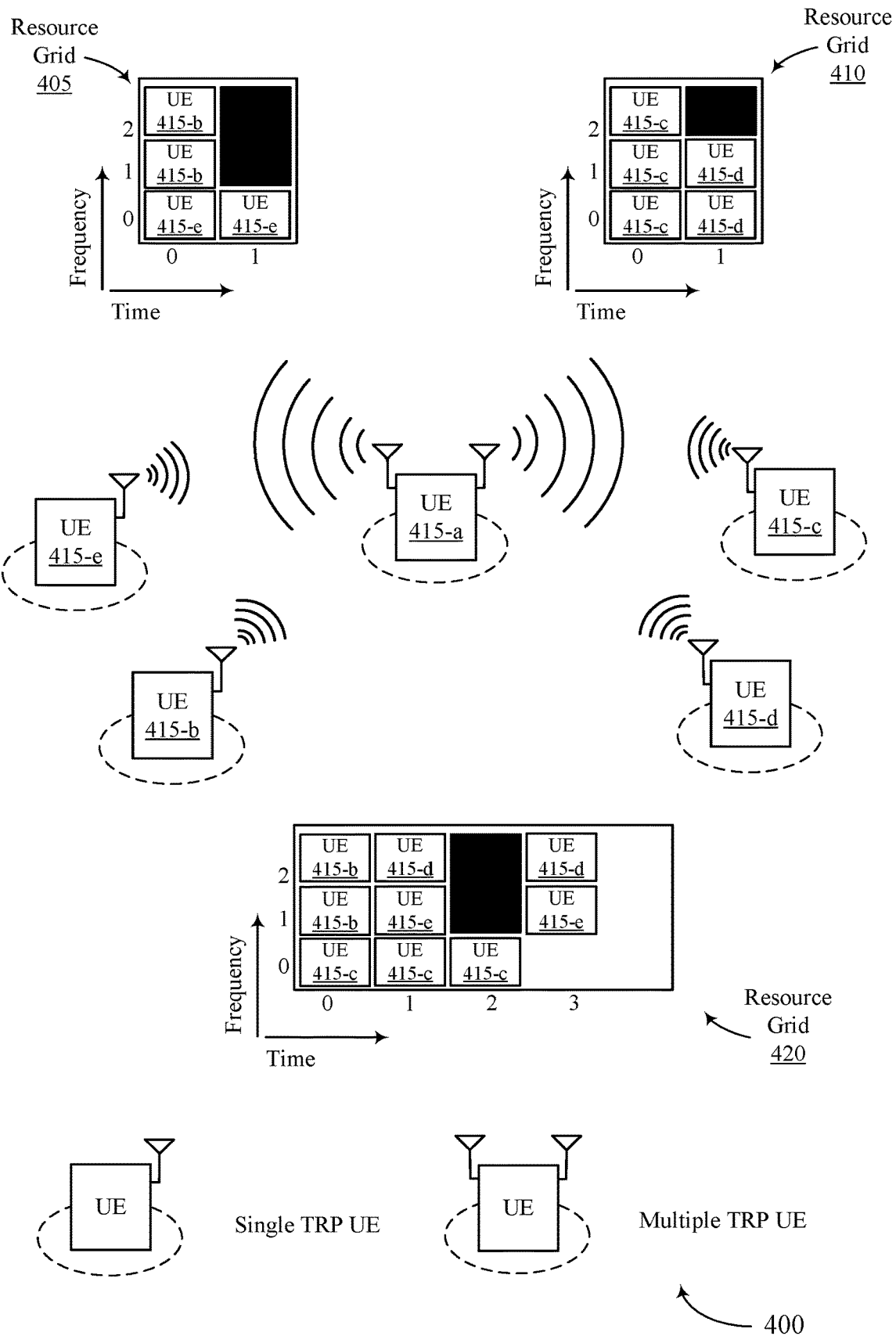

FIG. 4 illustrates an example of a wireless communications system 400 in accordance with various aspects of the present disclosure. The wireless communications system 400 may support multiple radio access technologies including 4G systems such as LTE systems, LTE-A systems, or LTE-A Pro systems, and 5G systems which may be referred to as NR systems. In some examples, the wireless communications system 400 may implement aspects of the wireless communications system 100, the wireless communications system 200, and the wireless communications system 300. For example, the wireless communications system 400 may support sidelink communications between multiple UEs 415, which may be examples of corresponding devices described with reference to FIGS. 1 through 3, respectively. Examples of sidelink communications may include V2V communications, V2X communications, and the like. The wireless communications system 300 may support improvements to power consumption and, in some examples, may promote higher reliability and lower latency sidelink communications, among other benefits.

One or more UEs 315, in the wireless communications system 400, may be configured with multiple antennas, which may be used to employ techniques such as transmit diversity, receive diversity, multiple-input multiple-output communications, or beamforming, or any combination thereof. The antennas of the one or more UEs 415 may be located within one or more antenna arrays or antenna panels, which may support multiple-input multiple-output operations or transmit or receive beamforming. The one or more UEs 415 may have an antenna array with a number of rows and columns of antenna ports that the one or more UEs 415 may use to support beamforming of sidelink communications. Likewise, the one or more UEs 415 may have one or more antenna arrays that may support various multiple-input multiple-output or beamforming operations for sidelink communications. Additionally or alternatively, an antenna panel may support radio frequency beamforming for a signal transmitted via one or more antenna ports. The one or more UEs 415 may thus be configured to support directional sidelink communications using one or multiple antennas. One or more UEs 415, in the wireless communications system 400, may thereby be configured with a single TRP (e.g., a single transmit and receive chain) or multiple TRPs (e.g., multiple transmit and receive chains). In the example of FIG. 4, a UE 415-*a* may be configured with multiple TRPs, while UEs 415-*b* through 415-*e* may be configured with a single TRP. One or more UEs 415, in the wireless communications system 400, may be configured to support beamforming for sidelink communications. For example, the UE 415-*a* may support beamforming for sidelink communications with the UE 415-*b* through the UE 415-*e*.

In some examples, the UE 415-*a* may determine a resource allocation for sidelink communications with the UE 415-*b* through the UE 415-*e*. For example, the UE 415-*a* may transmit, and receive, sidelink communications to and from the UE 415-*b* through the UE 415-*e* according to resource allocations corresponding to a resource grid 405 and a resource grid 410. The resource grid 405 may correspond to a first TRP associated with the UE 415-*a*, while the resource grid 410 may correspond to a second TRP associated with the UE 415-*a*. The resource grid 405 and the resource grid 410 may refer to a combination of frequency resources (e.g., subcarriers, carriers) and time resources (e.g., symbols, minislots, slots, subframes, frames). In some cases when the UE 415-*a* determines resource allocation without beamforming isolation and power control, the UE 415-*a* may transmit, and receive, sidelink communications according to a resource grid 420. The resource grid 420 may refer to a combination of frequency resources (e.g., subcarriers, carriers) and time resources (e.g., symbols, minislots, slots, subframes, frames).

In the example of FIG. 4, the UE 415-*a* may determine and generate a directional beam towards the UE 415-*b* and the UE 415-*e* using a first TRP associated with the UE 415-*a*. The resource grid 405 may thereby correspond to resource allocation for the directional beam towards the UE 415-*b* and the UE 415-*e*. In some examples, the UE 415-*a* may determine and generate a directional beam towards the UE 415-*c* and the UE 415-*d* using a second TRP associated with the UE 415-*a*. The resource grid 410 may thereby correspond to resource allocation for the directional beam towards the UE 415-*c* and the UE 415-*d*. In some examples, the UE 415-*a* may transmit a beamforming request message to one or more of the UE 415-*b* through UE 415-*e* to beamform towards the first TRP associated with the UE 415-*a* or the second TRP associated with the UE 415-*a*. In some examples, the UE 415-*a* may transmit the beamforming request message to one or more of the UE 415-*b* through UE 415-*e* to beamform towards the UE 415-*a* based in part on that one or more of the UE 415-*b* through UE 415-*e* are configured to support beamforming.

The UE 415-*a* may thus determine (e.g., allocate, assign) resource allocation for one or more of the UE 415-*b* through UE 415-*e* over a time domain, a frequency domain, and a spatial domain using beamforming. In some examples, the UE 415-*a* may be configured to provide power control for one or more of the UE 415-*b* through UE 415-*e* to mitigate interference in the wireless communications system 400. By supporting beamforming-based isolation plus power control, the UE 415-*a* may experience reduced latency associated with reception of sidelink communications. The UE 415-*a* also experience improved resource utilization for sidelink communications.

Figure 5:
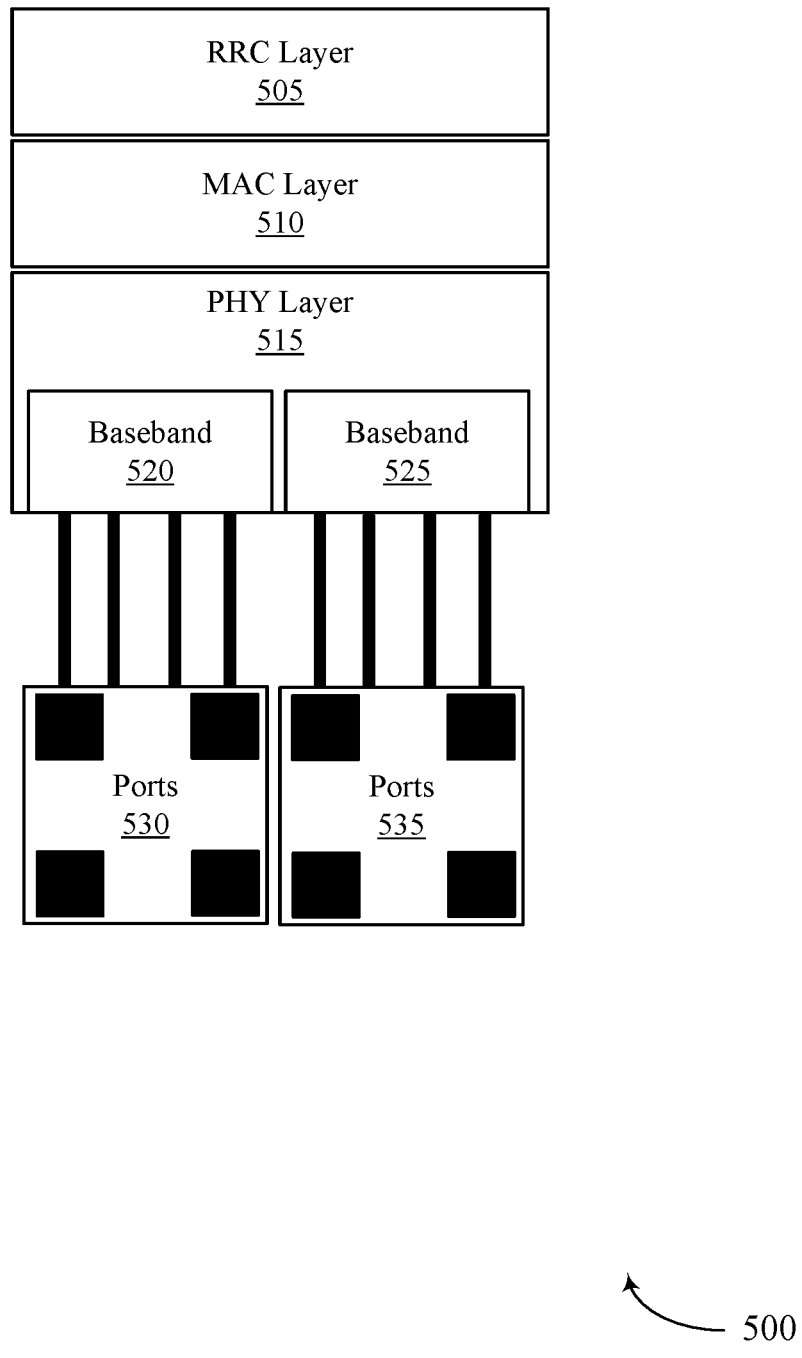
FIG. 5 illustrates an example of a protocol stack in accordance with various aspects of the present disclosure.

FIG. 5 illustrates an example of a protocol stack 500 in accordance with various aspects of the present disclosure. A device may be configured with the protocol stack 500. The device may be an example of aspects of a UE as described in FIGS. 1 through 4, respectively. The protocol stack 500 may include an RRC layer 505, a MAC layer 510, and a PHY layer 515. Each of these layers may communicate, directly or indirectly, with one another (e.g., via one or more buses). The protocol stack 500 may support sidelink communications between multiple UEs, which may be examples of corresponding devices described with reference to FIGS. 1 through 4, respectively. Examples of sidelink communications may include V2V communications, V2X communications, and the like.

The RRC layer 505 may provide establishment, configuration, and maintenance of a connection (e.g., a sidelink connection) between a multiple TRP UE 115 and a peer UE 115, or between the multiple TRP UE 115 and a base station 105 or a core network 130 supporting radio bearers for user plane data, as described with reference to FIG. 1, respectively. The MAC layer 510 may perform priority handling and multiplexing of logical channels into transport channels. The MAC layer 510 may also use error detection techniques, error correction techniques, or both to support retransmissions at the MAC layer to improve link efficiency (e.g., sidelink efficiency).

The PHY layer 515 may map transport channels to physical channels. The physical channels may be physical sidelink channels, such as a physical sidelink shared channel (PSSCH), a physical sidelink control channel (PSCCH), a physical sidelink discovery channel (PSDCH), or a physical sidelink broadcast channel (PSBCH), or the like. In some examples, the PHY layer 515 may include a baseband 520 and a baseband 525. The baseband 520 may map to one or more ports 530, while the baseband 525 may map to one or more ports 535.

A multiple TRP UE may collect sidelink information associated with peer UEs on one or both the ports 530 and the ports 535. For example, the multiple TRP UE may collect RSRP information associated with one or more peer UEs on one or both the ports 530 and the ports 535. The multiple TRP UE may collect the sidelink information in an omni-directional manner or in a beamformed manner, or both. In some examples, the ports 530 may correspond to one TRP of the multiple TRP UE, while the ports 535 may correspond to another TRP of the multiple TRP UE. Each TRP may have separate transmitter and receiver chains. In some examples, the RRC layer 505, the MAC layer 510, and the PHY layer 515 may correspond to common processing by a UE, while the baseband 520, the baseband 525, the ports 530, and the ports 535 may correspond to separate radio frequency and digital processing. In other words, part of the digital processing and upper layer functionality are common. The radio frequency chain and part of baseband are separate and some PHY layer procedures and MAC layer and RRC layer procedures are common.

Figure 6:
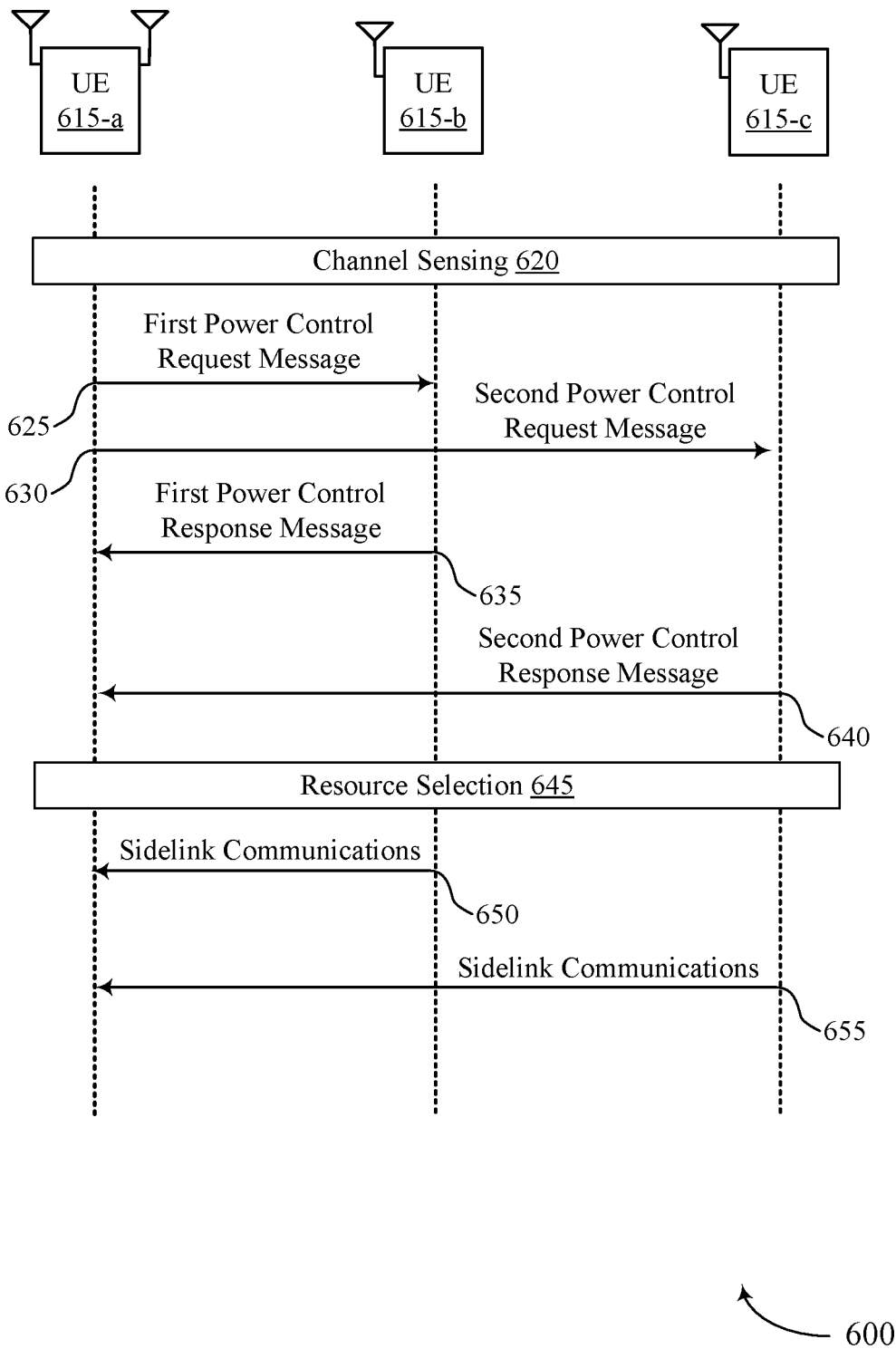
FIGS. 6 through 9 illustrate examples of process flows in accordance with various aspects of the present disclosure.

FIG. 6 illustrates an example of a process flow 600 in accordance with various aspects of the present disclosure. The process flow 600 may implement aspects of the wireless communications system 100, the wireless communications system 200, the wireless communications system 300, and the wireless communications system 400 as described with reference to FIGS. 1 through 4, respectively. For example, the process flow 600 may be based on a configuration by UEs 615, and implemented by the UEs 615, for reduced power consumption, improved resource utilization for sidelink communications, and may promote low latency for sidelink communications, among other benefits. The UEs 615 may be examples of a UE as described with reference to FIGS. 1 through 5.

One or more UEs 615, in the process flow 600, may be configured with a single TRP (e.g., a single transmit and receive chain) or multiple TRPs (e.g., multiple transmit and receive chains). In the example of FIG. 6, a UE 615-*a* may be configured with multiple TRPs (e.g., a multi-TRP enabled UE), while a UE 615-*b* and a UE 615-*c* may be configured with a single TRP. In the following description of the process flow 600, the operations between a UE 615-a, a UE 615-b, and a UE 615-c may be transmitted in a different order than the example order shown, or the operations performed by the UE 615-a, the UE 615-b, and the UE 615-c may be performed in different orders or at different times. Some operations may also be omitted from the process flow 600, and other operations may be added to the process flow 600.

At 620, one or more of the UE 615-a, the UE 615-b, and the UE 615-c may perform channel sensing by monitoring one or more sidelink channels using one or more TRPs associated with the UE 615-a, the UE 615-b, and the UE 615-c. In some examples, the UE 615-a may determine whether the UE 615-b and the UE 615-c can be coallocated in a time domain and a frequency domain. For example, the UE 615-a may determine resources for both the UE 615-b and the UE 615-c based in part on sidelink information associated with the UE 615-b and the UE 615-c. The resources may be same resource blocks (e.g., same time and frequency resource blocks). In some examples, the UE 615-a may determine to space-division multiplexing sidelink communications for the UE 615-b and the UE 615-c based in part on the sidelink information associated with the UE 615-b and the UE 615-c. The sidelink information may include an RSRP indicator or an RSRQ indicator, or both.

At 625, the UE 615-a may transmit a first power control request message to the UE 615-b. At 630, the UE 615-a may transmit a second power control request message to the UE 615-c. The first power control request message and the second power control request message may be an RRC message. The UE 615-a may transmit the first power control request message and the second power control request message based in part on determining that the UE 615-b and the UE 615-c can be multiplex in a spatial domain if one or both the UE 615-b and the UE 615-c reduce a transmit power level. The first power control request message or the second power control request message, or both, may thereby include an indication of a transmit power parameter to adjust a transmit power value of one or both the UE 615-b and the UE 615-c. The transmit power value may be referred to as a preferred transmit power level, a transmit power decrement value, or a transmit power increment value.

In some examples, the UE 615-a may transmit the first power control request message to the UE 615-b via a first TRP associated with the UE 615-a, and transmit the second power control request message to the UE 615-c via a second TRP associated with the UE 615-a different from the first TRP associated with the UE 615-a. In some other examples, the UE 615-a may transmit the first power control request message to the UE 615-b and transmit the second power control request message to the UE 615-c using a same TRP of the multiple TRPs associated with the UE 615-a. In some examples, the UE 615-a may transmit the first power control request message to the UE 615-b via a first directional beam, and transmit the second power control request message to the UE 615-c via a second directional beam different from the first directional beam.

In some examples, the UE 615-a may, additionally or alternatively, determine that one or both the UE 615-b and the UE 615-c are capable of beamforming. To reduce or eliminate interference towards sidelink transmission from other UEs, the UE 615-a may also transmit a beam modification request message to one or both the UE 615-b and the UE 615-c. The beam modification request message may include an indication of one or multiple directional beams to be used for sidelink communications (e.g., sidelink transmissions). In some other examples, the beam modification request message may include an indication of one or multiple directional beams that should be activated or deactivated (e.g., turned on or off). In other examples, the beam modification request message may include an indication setting a transmit power value (e.g., a maximum transmit power) that may be used for the one or multiple directional beams. The UE 615-a may combine this request with the power control requests. For example, the UE 615-a may indicate one or more of the preferred transmit power level, the transmit power decrement value, or the transmit power increment value, per directional beam. One or both of the UE 615-b and the UE 615-c may response with a beam modification response message indicating that the UE 615-b and the UE 615-c accepted or rejected the beam modification request. In some examples, when one or both of the UE 615-b and the UE 615-c reject the beam modification request, the UE 615-a may fallback on the power control request. In other words, if the UE 615-b and the UE 615-c reject the beam modification request, the UE 615-a may use the power control requests to coallocate the UE 615-b and the UE 615-c.

At 635, the UE 615-b may transmit a first power control response message to the UE 615-a. At 640, the UE 615-c may transmit a second power control response message to the UE 615-a. One or both of the UE 615-b and the UE 615-c may receive the first power control request message and the second power control request message from the UE 615-a, and determine whether to accept or reject the preferred transmit power level, the transmit power decrement value, or the transmit power increment value indicated by the transmit power parameter in the first power control request message and the second power control request message. Therefore, one or both of the UE 615-b and the UE 615-c may accept the preferred transmit power level, the transmit power decrement value, or the transmit power increment value, and send a power control response message indicating the acceptance. Alternatively, one or both of the UE 615-b and the UE 615-c may reject the preferred transmit power level, the transmit power decrement value, or the transmit power increment value, and send a power control response message indicating the rejection (e.g., indicating that one or both of the UE 615-b and the UE 615-c are unwilling to adjust a transmit power level).

At 645, one or more of the UE 615-a, the UE 615-b, and the UE 615-c may determine time and frequency resources for sidelink communications. In some examples, the UE 615-a may determine the time and frequency resources for sidelink communications with the UE 615-b and the UE 615-c based in part on the first power control response message and the second power control response message. Therefore, the UE 615-a may multiplex the sidelink communications from the UE 615-b and the UE 615-c over the time and frequency resources, where the multiplexing is space-division multiplexing. The UE 615-a may transmit sidelink control information (SCI) for sidelink data to one or both the UE 615-b and the UE 615-c, if both the UE 615-b and the UE 615-c accept the power control request. At 650, the UE 615-b may transmit sidelink communications (e.g., sidelink data) on the time and frequency resources to the UE 615-a. At 655, the UE 615-c may transmit sidelink communications (e.g., sidelink data) on the time and frequency resources to the UE 615-a.

Figure 7:
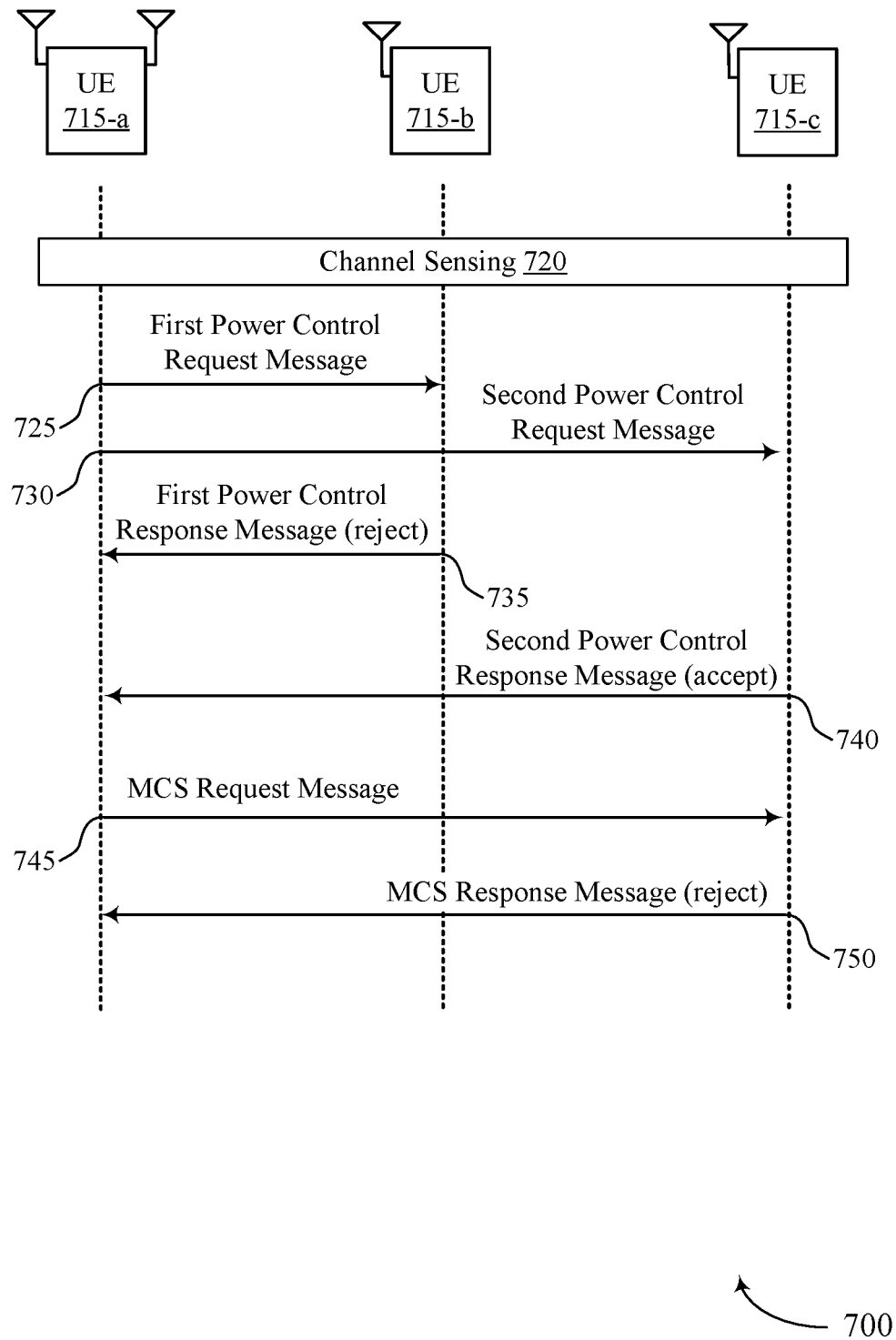

FIG. 7 illustrates an example of a process flow 700 in accordance with various aspects of the present disclosure. The process flow 700 may implement aspects of the wireless communications system 100, the wireless communications system 200, the wireless communications system 300, and the wireless communications system 400 as described with reference to FIGS. 1 through 4, respectively. For example, the process flow 700 may be based on a configuration by UEs 715, and implemented by the UEs 715, for reduced power consumption, improved resource utilization for sidelink communications, and may promote low latency for sidelink communications, among other benefits. The UEs 715 may be examples of a UE as described with reference to FIGS. 1 through 5.

One or more UEs 715, in the process flow 700, may be configured with a single TRP (e.g., a single transmit and receive chain) or multiple TRPs (e.g., multiple transmit and receive chains). In the example of FIG. 7, a UE 715-a may be configured with multiple TRPs (e.g., a multi-TRP enabled UE), while a UE 715-b and a UE 715-c may be configured with a single TRP. In the following description of the process flow 700, the operations between a UE 715-a, a UE 715-b, and a UE 715-c may be transmitted in a different order than the example order shown, or the operations performed by the UE 715-a, the UE 715-b, and the UE 715-c may be performed in different orders or at different times. Some operations may also be omitted from the process flow 700, and other operations may be added to the process flow 700.

At 720, one or more of the UE 715-a, the UE 715-b, and the UE 715-c may perform channel sensing by monitoring one or more sidelink channels using one or more TRPs associated with the UE 715-a, the UE 715-b, and the UE 715-c. In some examples, the UE 715-a may determine whether the UE 715-b and the UE 715-c can be coallocated in a time domain and a frequency domain. For example, the UE 715-a may determine resources for both the UE 715-b and the UE 715-c based in part on sidelink information associated with the UE 715-b and the UE 715-c. The resources may be same resource blocks (e.g., same time and frequency resource blocks). In some examples, the UE 715-a may determine to space-division multiplex sidelink communications for the UE 715-b and the UE 715-c based in part on the sidelink information associated with the UE 715-b and the UE 715-c. The sidelink information may include an RSRP indicator or an RSRQ indicator, or both.

At 725, the UE 715-a may transmit a first power control request message to the UE 715-b. At 730, the UE 715-a may transmit a second power control request message to the UE 715-c. The first power control request message and the second power control request message may be an RRC message. The UE 715-a may transmit the first power control request message and the second power control request message based in part on determining that the UE 715-b and the UE 715-c can be multiplexed in a spatial domain if one or both the UE 715-b and the UE 715-c reduce a transmit power level. The first power control request message or the second power control request message, or both, may thereby include an indication of a transmit power parameter to adjust a transmit power value of one or both the UE 715-b and the UE 715-c. The transmit power value may be referred to as a preferred transmit power level, a transmit power decrement value, or a transmit power increment value.

In some examples, the UE 715-a may transmit the first power control request message to the UE 715-b via a first TRP associated with the UE 715-a, and transmit the second power control request message to the UE 715-c via a second TRP associated with the UE 715-a different from the first TRP associated with the UE 715-a. In some other examples, the UE 715-a may transmit the first power control request message to the UE 715-b and transmit the second power control request message to the UE 715-c using a same TRP of the multiple TRPs associated with the UE 715-a. In some examples, the UE 715-a may transmit the first power control request message to the UE 715-b via a first directional beam, and transmit the second power control request message to the UE 715-c via a second directional beam different from the first directional beam.

At 735, the UE 715-b may transmit a first power control response message to the UE 715-a. At 740, the UE 715-c may transmit a second power control response message to the UE 715-a. One or both of the UE 715-b and the UE 715-c may receive the first power control request message and the second power control request message from the UE 715-a, and determine whether to accept or reject the preferred transmit power level, the transmit power decrement value, or the transmit power increment value indicated by the transmit power parameter in the first power control request message and the second power control request message.

One or both of the UE 715-b and the UE 715-c may accept the preferred transmit power level, the transmit power decrement value, or the transmit power increment value, and send a power control response message indicating the acceptance. Alternatively, one or both of the UE 715-b and the UE 715-c may reject the preferred transmit power level, the transmit power decrement value, or the transmit power increment value, and send a power control response message indicating the rejection (e.g., indicating that one or both of the UE 715-b and the UE 715-c are unwilling to adjust a transmit power level). In the example of FIG. 7, the UE 715-b may reject the preferred transmit power level, the transmit power decrement value, or the transmit power increment value, and indicate the rejection in the power control response message. The UE 715-c, in the example of FIG. 7, may accept the preferred transmit power level, the transmit power decrement value, or the transmit power increment value, and indicate the acceptance in the power control response message.

In some examples, if one or both of the UE 715-b and the UE 715-c reject the power control request from the UE 715-a, the UE 715-a may transmit an MCS request message including an MCS restriction, which may be a threshold MCS (e.g., a maximum MCS, a minimum MCS). At 745, in the example of FIG. 7, the UE 715-a may transmit an MCS request message to the UE 715-c. The MCS request message may include an indication of a maximum MCS at which the UE 715-c can transmit. At 750, the UE 715-c may transmit an MCS response message to the UE 715-a. In the example of FIG. 7, the MCS response message may include an indication that the UE 715-c rejected the MCS restriction. In this case, the UE 715-a cannot coallocate time and frequency resources across multiple TRPs for the UE 715-b and the UE 715-c.

Figure 8:
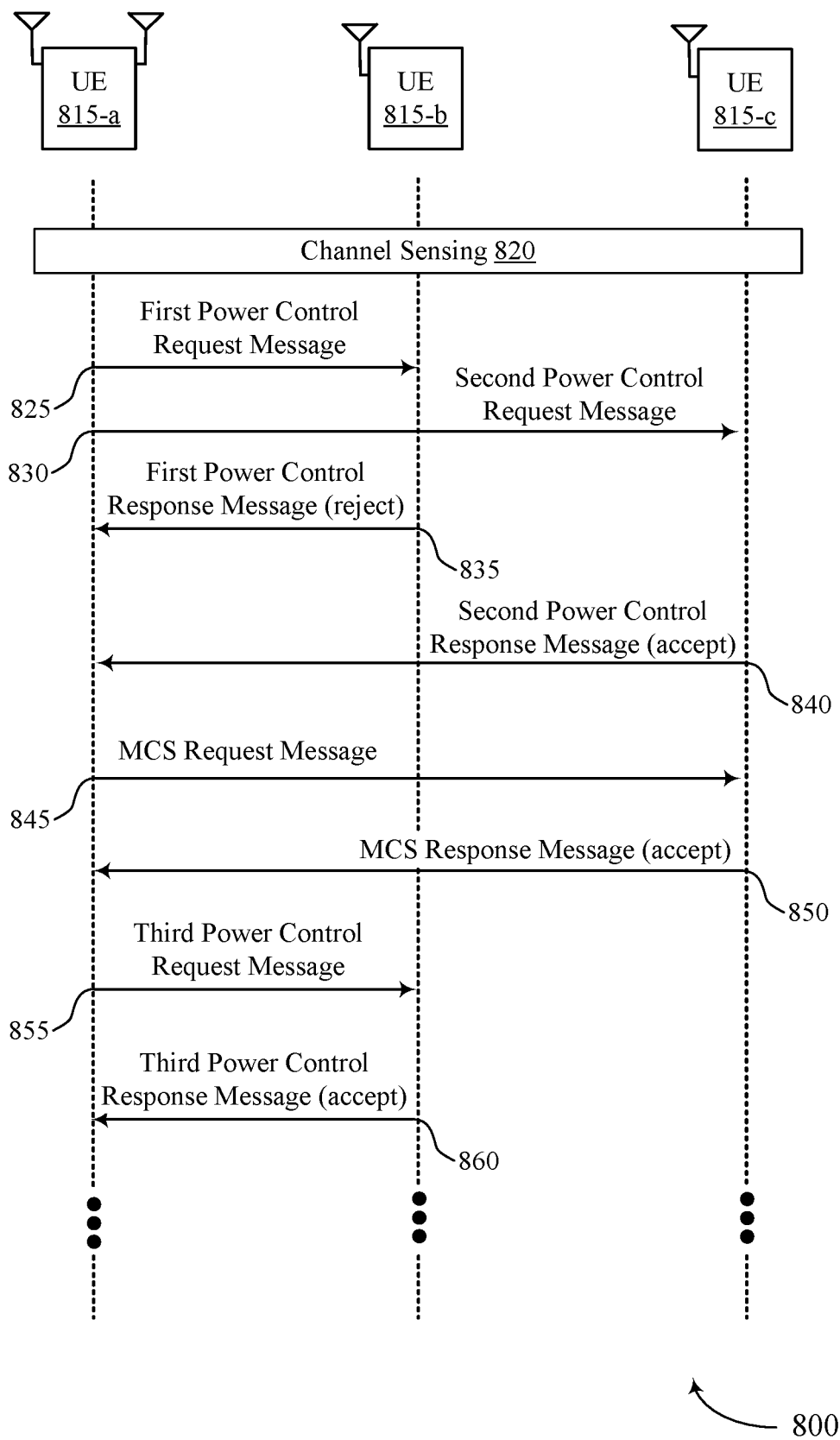

FIG. 8 illustrates an example of a process flow 800 in accordance with various aspects of the present disclosure. The process flow 800 may implement aspects of the wireless communications system 100, the wireless communications system 200, the wireless communications system 300, and the wireless communications system 400 as described with reference to FIGS. 1 through 4, respectively. For example, the process flow 800 may be based on a configuration by UEs 815, and implemented by the UEs 815, for reduced power consumption, improved resource utilization for sidelink communications, and may promote low latency for sidelink communications, among other benefits. The UEs 815 may be examples of a UE as described with reference to FIGS. 1 through 5.

One or more UEs 815, in the process flow 800, may be configured with a single TRP (e.g., a single transmit and receive chain) or multiple TRPs (e.g., multiple transmit and receive chains). In the example of FIG. 8, a UE 815-*a* may be configured with multiple TRPs (e.g., a multi-TRP enabled UE), while a UE 815-*b* and a UE 815-*c* may be configured with a single TRP. In the following description of the process flow 800, the operations between a UE 815-*a*, a UE 815-*b*, and a UE 815-*c* may be transmitted in a different order than the example order shown, or the operations performed by the UE 815-*a*, the UE 815-*b*, and the UE 815-*c* may be performed in different orders or at different times. Some operations may also be omitted from the process flow 800, and other operations may be added to the process flow 800.

At 820, one or more of the UE 815-*a*, the UE 815-*b*, and the UE 815-*c* may perform channel sensing by monitoring one or more sidelink channels using one or more TRPs associated with the UE 815-*a*, the UE 815-*b*, and the UE 815-*c*. In some examples, the UE 815-*a* may determine whether the UE 815-*b* and the UE 815-*c* can be coallocated in a time domain and a frequency domain. For example, the UE 815-*a* may determine resources for both the UE 815-*b* and the UE 815-*c* based in part on sidelink information associated with the UE 815-*b* and the UE 815-*c*. The resources may be same resource blocks (e.g., same time and frequency resource blocks). In some examples, the UE 815-*a* may determine to space-division multiplex sidelink communications for the UE 815-*b* and the UE 815-*c* based in part on the sidelink information associated with the UE 815-*b* and the UE 815-*c*. The sidelink information may include an RSRP indicator or an RSRQ indicator, or both.

At 825, the UE 815-*a* may transmit a first power control request message to the UE 815-*b*. At 830, the UE 815-*a* may transmit a second power control request message to the UE 815-*c*. The first power control request message and the second power control request message may be an RRC message. The UE 815-*a* may transmit the first power control request message and the second power control request message based in part on determining that the UE 815-*b* and the UE 815-*c* can be multiplexed in a spatial domain if one or both the UE 815-*b* and the UE 815-*c* reduce a transmit power level. The first power control request message or the second power control request message, or both, may thereby include an indication of a transmit power parameter to adjust a transmit power value of one or both the UE 815-*b* and the UE 815-*c*. The transmit power value may be referred to as a preferred transmit power level, a transmit power decrement value, or a transmit power increment value.

In some examples, the UE 815-*a* may transmit the first power control request message to the UE 815-*b* via a first TRP associated with the UE 815-*a*, and transmit the second power control request message to the UE 815-*c* via a second TRP associated with the UE 815-*a* different from the first TRP associated with the UE 815-*a*. In some other examples, the UE 815-*a* may transmit the first power control request message to the UE 815-*b* and transmit the second power control request message to the UE 815-*c* using a same TRP of the multiple TRPs associated with the UE 815-*a*. In some examples, the UE 815-*a* may transmit the first power control request message to the UE 815-*b* via a first directional beam, and transmit the second power control request message to the UE 815-*c* via a second directional beam different from the first directional beam.

At 835, the UE 815-*b* may transmit a first power control response message to the UE 815-*a*. At 840, the UE 815-*c* may transmit a second power control response message to the UE 815-*a*. One or both of the UE 815-*b* and the UE 815-*c* may receive the first power control request message and the second power control request message from the UE 815-*a*, and determine whether to accept or reject the preferred transmit power level, the transmit power decrement value, or the transmit power increment value indicated by the transmit power parameter in the first power control request message and the second power control request message.

One or both of the UE 815-*b* and the UE 815-*c* may accept the preferred transmit power level, the transmit power decrement value, or the transmit power increment value, and send a power control response message indicating the acceptance. Alternatively, one or both of the UE 815-*b* and the UE 815-*c* may reject the preferred transmit power level, the transmit power decrement value, or the transmit power increment value, and send a power control response message indicating the rejection (e.g., indicating that one or both of the UE 815-*b* and the UE 815-*c* are unwilling to adjust a transmit power level). In the example of FIG. 8, the UE 815-*b* may reject the preferred transmit power level, the transmit power decrement value, or the transmit power increment value, and indicate the rejection in the power control response message. The UE 815-*c*, in the example of FIG. 8, may accept the preferred transmit power level, the transmit power decrement value, or the transmit power increment value, and indicate the acceptance in the power control response message.

In some examples, if one or both of the UE 815-*b* and the UE 815-*c* reject the power control request from the UE 815-*a*, the UE 815-*a* may transmit an MCS request message including an MCS restriction, which may be a threshold MCS (e.g., a maximum MCS, a minimum MCS). At 845, in the example of FIG. 8, the UE 815-*a* may transmit an MCS request message to the UE 815-*c*. The MCS request message may include an indication of a maximum MCS at which the UE 815-*c* can transmit. At 850, the UE 815-*c* may transmit an MCS response message to the UE 815-*a*. In the example of FIG. 8, the MCS response message may include an indication that the UE 815-*c* accepted the MCS restriction. In some examples, if the UE 815-*c* rejects the MCS restriction request, the UE 815-*a* can transmit another MCS restriction request with a lower or a higher MCS restriction to the UE 815-*c*. In this case, the UE 815-*a* may co-allocate time and frequency resources across multiple TRPs for the UE 815-*b* and the UE 815-*c* based on the negotiated MCS restriction with the UE 815-*c*.

In some examples, if the UE 815-*c* accepts the MCS restriction request, the UE 815-*a* may transmit another power control request message with a different transmit power (e.g., a higher transmit power value) to the UE 815-*b* that had rejected first power control request. At 855, the UE 815-*a* may transmit a third power control request message to the UE 815-*b*. At 860, the UE 815-*b* may transmit a third power control response message to the UE 815-*a*. The third power control request message may include an indication of a different transmit power value (e.g., a higher or a lower preferred transmit power level, a transmit power decrement value, or a transmit power increment value).

In the example of FIG. 8, the UE 815-*b* may accept the different transmit power value, and therefore, the UE 815-*a* may multiplex the sidelink communications from the UE 815-*b* and the UE 815-*c* over the time and frequency resources, where the multiplexing is space-division multiplexing. The UE 815-*a* may transmit SCI for sidelink data to one or both the UE 815-*b* and the UE 815-*c*, if both the UE 815-*b* and the UE 815-*c* accept the power control requests or the MCS restriction requests, or both. The UE 815-*b* may transmit sidelink communications (e.g., sidelink data) on the time and frequency resources to the UE 815-*a*, and the UE 815-*c* may transmit sidelink communications (e.g., sidelink data) on the time and frequency resources to the UE 815-*a*, as described in FIG. 6, respectively.

Figure 9:
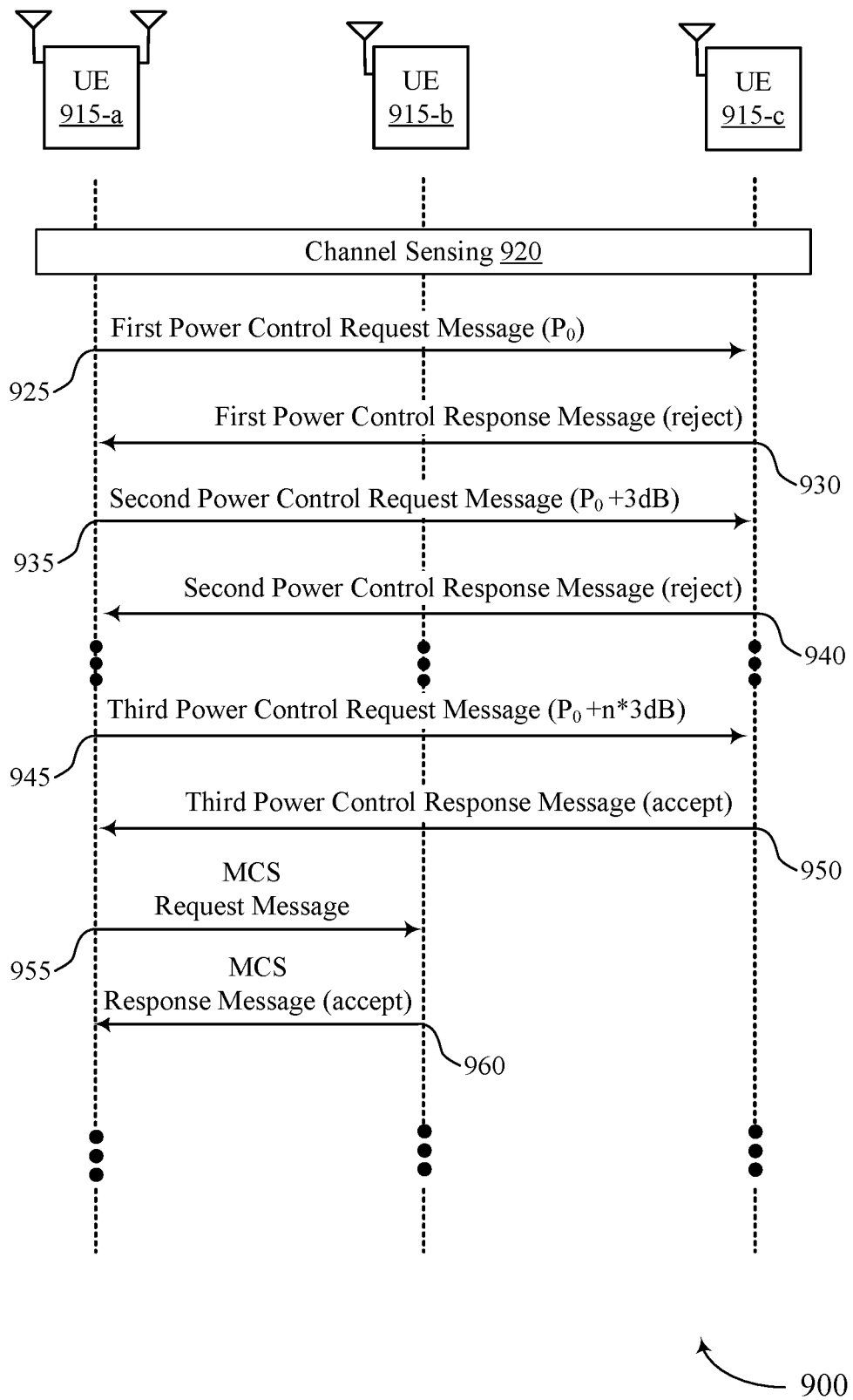

FIG. 9 illustrates an example of a process flow 900 in accordance with various aspects of the present disclosure. The process flow 900 may implement aspects of the wireless communications system 100, the wireless communications system 200, the wireless communications system 300, and the wireless communications system 400 as described with reference to FIGS. 1 through 4, respectively. For example, the process flow 900 may be based on a configuration by UEs 915, and implemented by the UEs 915, for reduced power consumption, improved resource utilization for sidelink communications, and may promote low latency for sidelink communications, among other benefits. The UEs 915 may be examples of a UE as described with reference to FIGS. 1 through 5.

One or more UEs 915, in the process flow 900, may be configured with a single TRP (e.g., a single transmit and receive chain) or multiple TRPs (e.g., multiple transmit and receive chains). In the example of FIG. 9, a UE 915-*a* may be configured with multiple TRPs (e.g., a multi-TRP enabled UE), while a UE 915-*b* and a UE 915-*c* may be configured with a single TRP. In the following description of the process flow 900, the operations between a UE 915-*a*, a UE 915-*b*, and a UE 915-*c* may be transmitted in a different order than the example order shown, or the operations performed by the UE 915-*a*, the UE 915-*b*, and the UE 915-*c* may be performed in different orders or at different times. Some operations may also be omitted from the process flow 900, and other operations may be added to the process flow 900.

At 920, one or more of the UE 915-*a*, the UE 915-*b*, and the UE 915-*c* may perform channel sensing by monitoring one or more sidelink channels using one or more TRPs associated with the UE 915-*a*, the UE 915-*b*, and the UE 915-*c*. In some examples, the UE 915-*a* may determine whether the UE 915-*b* and the UE 915-*c* can be coallocated in a time domain and a frequency domain. For example, the UE 915-*a* may determine resources for both the UE 915-*b* and the UE 915-*c* based in part on sidelink information associated with the UE 915-*b* and the UE 915-*c*. The resources may be same resource blocks (e.g., same time and frequency resource blocks). In some examples, the UE 915-*a* may determine to space-division multiplex sidelink communications for the UE 915-*b* and the UE 915-*c* based in part on the sidelink information associated with the UE 915-*b* and the UE 915-*c*. The sidelink information may include an RSRP indicator or an RSRQ indicator, or both.

In the example of FIG. 9, the UE 915-*a* may transmit power control request message to both the UE 915-*b* and the UE 915-*c*. However, the UE 915-*b* may transmit a power control response message accepting the power control request from the UE 915-*a*, while the UE 915-*c* may transmit a power control response message rejecting the power control request from the UE 915-*a*. As such, the UE 915-*a* may negotiate a transmit power value with the UE 915-*c*. For example, at 925, the UE 915-*a* may transmit, to the UE 915-*c*, a first power control request message that may include an indication of a transmit power value ($P_0$). At 930, the UE 915-*c* may transmit, to the UE 915-*a*, a first power control response message still rejecting the transmit power value ($P_0$).

At 935, the UE 915-*a* may transmit, to the UE 915-*c*, a second power control request message include an indication of an adjusted transmit power value ($P_0$+3 dB). The adjusted transmit power value may be incremented or decremented by the UE 915-*a* by a value (e.g., ±3 dB) or may be incremented or decremented by a multiple of the value (e.g., n*3 dB). At 940, the UE 915-*c* may transmit, to the UE 915-*a*, a second power control response message still rejecting the adjusted transmit power value ($P_0$+3 dB).

At 945, the UE 915-*a* may transmit, to the UE 915-*c*, a third power control request message include an indication of another adjusted transmit power value ($P_0$+n*3 dB). The adjusted transmit power value may be incremented or decremented by the UE 915-*a* by a multiple of the value (e.g., n*3 dB). At 950, the UE 915-*c* may transmit, to the UE 915-*a*, a third power control response message accepting the adjusted transmit power value ($P_0$+n*3 dB). Thus, the UE 915-*a* may retransmit a power control request with an updated preferred transmit power value, etc., until the UE 915-*c* accepts a preferred transmit power value. Additionally, the UE 915-*a* may increase the preferred transmit power value by a value (e.g., 3 dB) in each successive power control request. The UE 915-*a* may thereby, if the power control request is rejected, update and resend power control request till a point where increasing a transmit power value is still beneficial to the UE 915-*c*.

In some examples, once a power control agreement is reached between the UE 915-*a* and the UE 915-*c*, the UE 915-*a* may at 955, transmit an MCS request message to the UE 915-*b*. The MCS request message may include an indication of an MCS restriction based on the negotiated transmit power value between the UE 915-*a* and the UE 915-*c*. At 960, the UE 915-*b* may transmit an MCS response message to the UE 915-*a*. Thus, peer UEs, such as the UE 915-*b* and the UE 915-*c* that agree to a quality of service (QoS) can be coallocated (e.g., space-division multiplexed).

Figure 10:
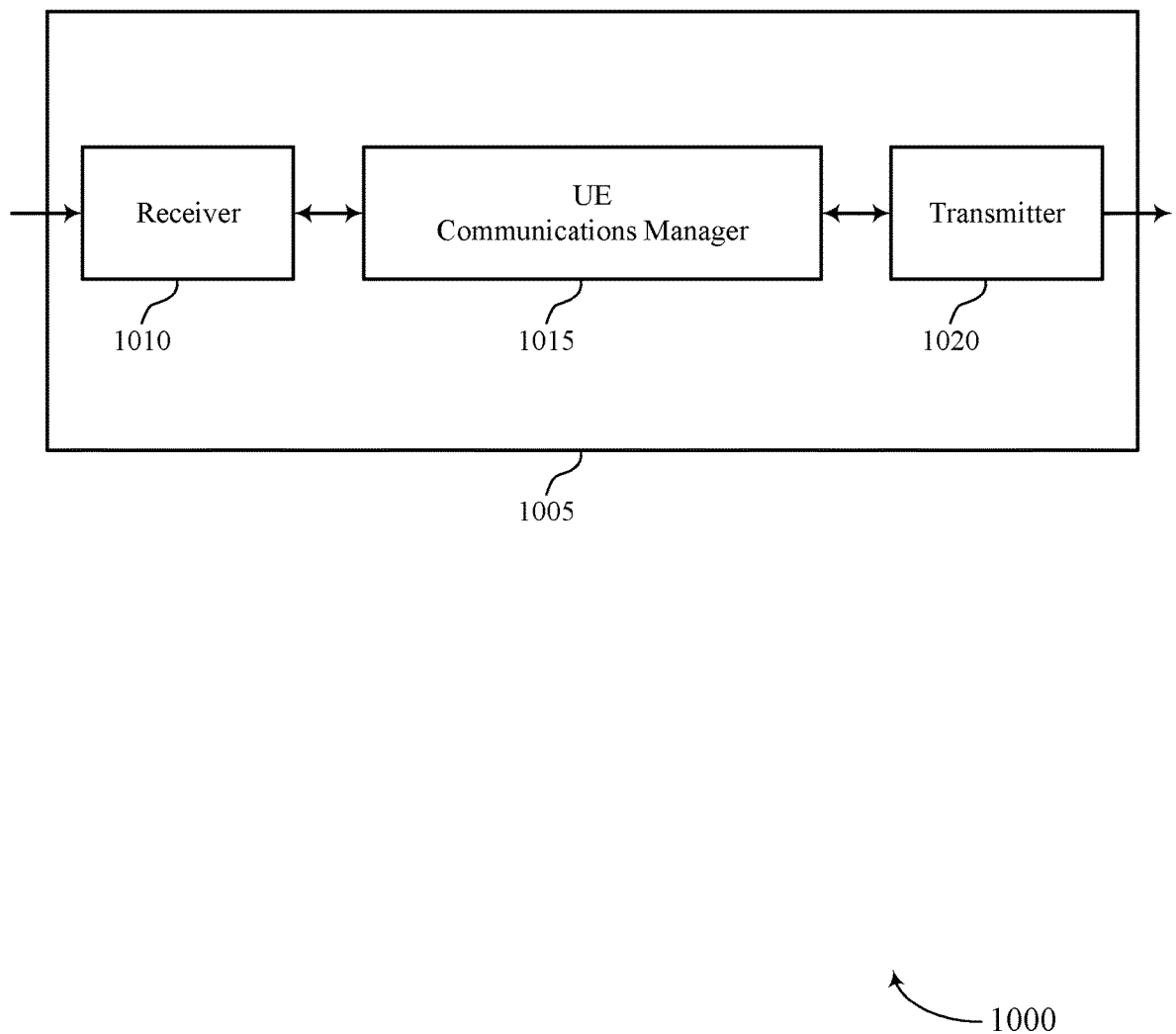
FIGS. 10 and 11 show block diagrams of devices in accordance with various aspects of the present disclosure.

FIG. 10 shows a block diagram 1000 of a device 1005 in accordance with various aspects of the present disclosure. The device 1005 may be an example of aspects of a UE 115 as described herein. For example, the device 1005 may be configured with a single TRP or multiple TRPs as described with reference to FIGS. 1 through 9. The device 1005 may include a receiver 1010, a UE communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for determining sidelink resources). Information may be passed on to other components of the device 1005. The receiver 1010 may be an example of aspects of the transceiver 1320 described with reference to FIG. 13. The receiver 1010 may utilize a single antenna or a set of antennas.

The UE communications manager 1015 may as described herein may be implemented to realize one or more potential improvements. One implementation may allow the device 1005 to reduce latency for sidelink communications in a wireless communications systems, such as in 5G systems. Another implementation may allow the device 1005 to improve resource utilization for sidelink communications with two or more peer devices by determining time and frequency resources for the two or more peer devices and space-division multiplexing the two or more peer devices over the determined time and frequency resources. Another implementation may allow the device 1005 to preserve sidelink resources (for example, time and frequency resources) and a battery life of the device 1005.

The UE communications manager 1015 may transmit a first power control request message to a first peer UE using a first TRP of at least two TRPs associated with the UE and a second power control request message to a second peer UE using the first TRP or a second TRP of the at least two TRPs associated with the UE, receive, in response to the transmitting, a first power control response message from the first peer UE using the first TRP of the UE and a second power control response message from the second peer UE using the first TRP or the second TRP of the UE, and determine time and frequency resources for the sidelink communications with the first peer UE and the second peer UE based on the received first power control response message and the received second power control response message.

The UE communications manager 1015 may also receive a power control request message from a peer UE, the power control request message including an indication of a transmit power value for the UE, the peer UE having multiple TRPs, transmit, based on the receiving, a power control response message from the peer UE, and transmit the sidelink communications to the peer UE according to the transmit power value. The UE communications manager 1015 may be an example of aspects of the UE communications manager 1310 described herein.

The UE communications manager 1015, or its sub-components, may be implemented in hardware, code (e.g., software or firmware) executed by a processor, or any combination thereof. If implemented in code executed by a processor, the functions of the UE communications manager 1015, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 1015, or its sub-components, may be physically located at various positions, including being distributed such that portions of functions are implemented at different physical locations by one or more physical components. In some examples, the UE communications manager 1015, or its sub-components, may be a separate and distinct component in accordance with various aspects of the present disclosure. In some examples, the UE communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
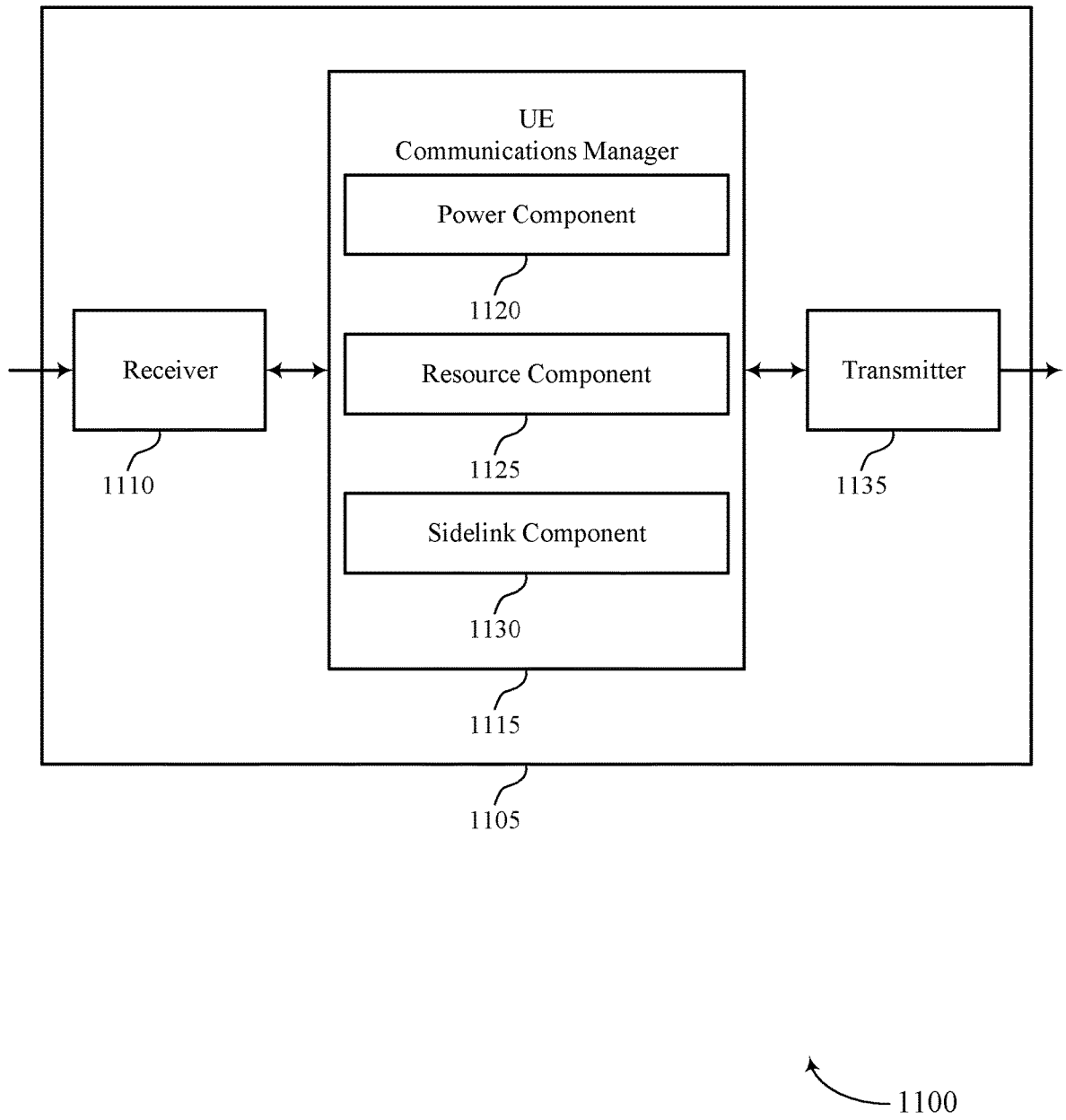

FIG. 11 shows a block diagram 1100 of a device 1105 in accordance with various aspects of the present disclosure. The device 1105 may be an example of aspects of a device 1005, or a UE 115 as described herein. For example, the device 1105 may be configured with a single TRP or multiple TRPs as described with reference to FIGS. 1 through 9. The device 1105 may include a receiver 1110, a UE communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for determining sidelink resources). Information may be passed on to other components of the device 1105. The receiver 1110 may be an example of aspects of the transceiver 1320 described with reference to FIG. 13. The receiver 1110 may utilize a single antenna or a set of antennas.

The UE communications manager 1115 may be an example of aspects of the UE communications manager 1015 as described herein. The UE communications manager 1115 may include a power component 1120, a resource component 1125, and a sidelink component 1130. The UE communications manager 1115 may be an example of aspects of the UE communications manager 1310 described herein.

The power component 1120 may transmit a first power control request message to a first peer UE using a first TRP of at least two TRPs associated with the UE and a second power control request message to a second peer UE using the first TRP or a second TRP of the at least two TRPs associated with the UE and receive, in response to the transmitting, a first power control response message from the first peer UE using the first TRP of the UE and a second power control response message from the second peer UE using the first TRP or the second TRP of the UE. The resource component 1125 may determine time and frequency resources for the sidelink communications with the first peer UE and the second peer UE based on the received first power control response message and the received second power control response message.

The power component 1120 may receive a power control request message from a peer UE, the power control request message including an indication of a transmit power value for the UE, the peer UE having multiple TRPs and transmit, based on the receiving, a power control response message from the peer UE. The sidelink component 1130 may transmit the sidelink communications to the peer UE according to the transmit power value.

The transmitter 1135 may transmit signals generated by other components of the device 1105. In some examples, the transmitter 1135 may be collocated with a receiver 1110 in a transceiver component. For example, the transmitter 1135 may be an example of aspects of the transceiver 1320 described with reference to FIG. 13. The transmitter 1135 may utilize a single antenna or a set of antennas.

Figure 12:
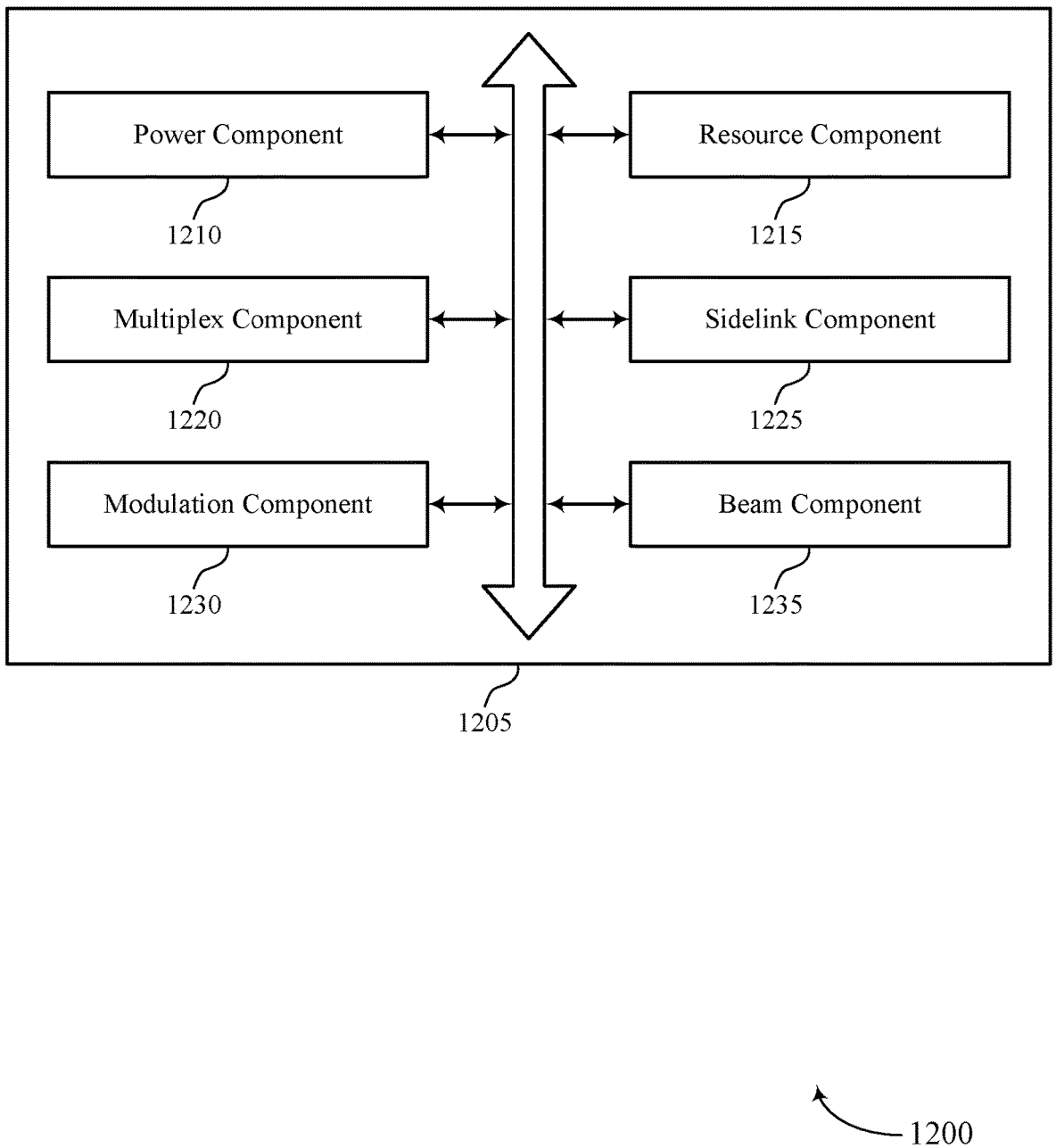
FIG. 12 shows a block diagram of a user equipment (UE) communications manager in accordance with various aspects of the present disclosure.

FIG. 12 shows a block diagram 1200 of a UE communications manager 1205 in accordance with various aspects of the present disclosure. The UE communications manager 1205 may be an example of aspects of a UE communications manager 1015, a UE communications manager 1115, or a UE communications manager 1310 described herein. The UE communications manager 1205 may include a power component 1210, a resource component 1215, a multiplex component 1220, a sidelink component 1225, a modulation component 1230, and a beam component 1235. Each of these components may communicate, directly or indirectly, with one another (e.g., via one or more buses).

The power component 1210 may transmit a first power control request message to a first peer UE using a first TRP of at least two TRPs associated with the UE and a second power control request message to a second peer UE using the first TRP or a second TRP of the at least two TRPs associated with the UE. In some examples, the power component 1210 may receive, in response to the transmitting, a first power control response message from the first peer UE using the first TRP of the UE and a second power control response message from the second peer UE using the first TRP or the second TRP of the UE. In some examples, the power component 1210 may receive a power control request message from a peer UE, the power control request message including an indication of a transmit power value for the UE, the peer UE having multiple TRPs. In some examples, the power component 1210 may transmit, based on the receiving, a power control response message from the peer UE.

In some examples, the power component 1210 may determine a first transmit power value for the first peer UE and a second transmit power value for the second peer UE based on sidelink information associated with the first peer UE and the second peer UE, where the first transmit power value is different from the second transmit power value. In some examples, the power component 1210 may determine that the first peer UE accepts the first transmit power value and the second peer UE accepts the second transmit power value based on the first power control response message and the second power control response message, where determining the time and frequency resources for the sidelink communications with the first peer UE and the second peer UE is based on the first peer UE accepting the first transmit power value and the second peer UE accepting the second transmit power value.

In some examples, the power component 1210 may transmit a third power control request message to the first peer UE using the first TRP of the UE based on the first MCS response message indicating the second peer UE accepting the first MCS restriction. In some examples, the power component 1210 may receive a third power control response message from the first peer UE using the first TRP of the UE based on the third power control request message. In some examples, the power component 1210 may determine that the first peer UE accepts the first transmit power value and the second peer UE rejects the second transmit power value based on the first power control response message and the second power control response message. In some examples, the power component 1210 may determine a third transmit power value different from the second transmit power value based on the second peer UE rejecting the second transmit power value.

In some examples, the power component 1210 may retransmit the second power control request message to the second peer UE using the second TRP of the UE based on the second power control response message indicating the second peer UE rejecting the second transmit power value, where the retransmitted second power control request message includes an indication of the third transmit power value. In some examples, the power component 1210 may update the second transmit power value by a transmit power adjustment value. In some examples, the power component 1210 may determine that the third transmit power value satisfies a threshold associated with the second peer UE, where retransmitting the second power control request message including the indication of the third transmit power value is based on the third transmit power value satisfying the threshold associated with the second peer UE.

In some examples, the power component 1210 may set a transmit power level of the UE based on the transmit power value indicated in the power control request message. In some cases, the first power control request message and the second power control request message include a transmit power parameter to adjust a transmit power value of the first peer UE and the second peer UE. In some cases, the first power control request message includes a first indication of the first transmit power value and the second power control request message includes a second indication of the second transmit power value. In some cases, the third power control request message includes a third indication of a third transmit power value different from the first transmit power value. In some cases, the first TRP is different from the second TRP.

The resource component 1215 may determine time and frequency resources for the sidelink communications with the first peer UE and the second peer UE based on the received first power control response message and the received second power control response message. In some cases, the determined time and frequency resources include same time and frequency resource blocks. The sidelink component 1225 may transmit the sidelink communications to the peer UE according to the transmit power value. In some examples, the sidelink component 1225 may transmit first SCI to the first peer UE using the first TRP of the UE and second SCI to the second peer UE using the second TRP of the UE based on the first power control response message indicating the first peer UE accepting the first transmit power value and the second power control response message indicating the second peer UE accepting the second transmit power value. In some examples, the sidelink component 1225 may receive SCI from the peer UE based on the power control response message indicating the UE accepting the transmit power value.

The multiplex component 1220 may determine to space-division multiplex the sidelink communications for the first peer UE and the second peer UE based on sidelink information associated with the first peer UE and the second peer UE, the sidelink information including a RSRP indicator or a RSRQ indicator, or both. In some examples, multiplexing the sidelink communications for the first peer UE and the second peer UE over the determined time and frequency resources, where the multiplexing includes space-division multiplexing.

The modulation component 1230 may transmit a first MCS request message to the second peer UE using the second TRP of the UE based on the first power control response message indicating the first peer UE rejecting the first transmit power value and the second power control response message indicating the second peer UE accepting the second transmit power value, where the first MCS request message includes a first MCS restriction. In some examples, the modulation component 1230 may receive a first MCS response message from the second peer UE using the second TRP of the UE based on the first MCS request message. In some examples, transmitting a second MCS request message to the second peer UE using the second TRP of the UE based on the third power control response message indicating the first peer UE rejecting the third transmit power value, where the second MCS request message includes a second MCS restriction different from the first MCS restriction. In some examples, the modulation component 1230 may receive a second MCS response message from the second peer UE using the second TRP of the UE based on the second MCS request message.

In some examples, the modulation component 1230 may determine the first MCS restriction or the second MCS restriction, or both, based on the sidelink information associated with the first peer UE and the second peer UE. In some examples, the modulation component 1230 may determine an MCS restriction for the first peer UE based on receiving a third power control response message indicating the second peer UE accepting the third transmit power value. In some examples, transmitting an MCS request message to the first peer UE using the first TRP of the UE, where the MCS request message includes an indication of the MCS restriction. In some examples, the modulation component 1230 may receive a MCS response message from the first peer UE using the first TRP of the UE based on the MCS request message, where determining the time and frequency resources for the sidelink communications with the first peer UE and the second peer UE is based on the first peer UE accepting the MCS restriction and the second peer UE accepting the third transmit power value. In some examples, receiving an MCS request message based on the power control response message indicating the UE rejecting the transmit power value, where the MCS request message includes an MCS restriction. In some examples, the modulation component 1230 may transmit an MCS response message based on the MCS request message.

The beam component 1235 may transmit a first beam modification request message to the first peer UE using the first TRP of the UE or a second beam modification request message to the second peer UE using the second TRP of the UE, or both, based on first capability information associated with the first peer UE or second capability information associated with the second peer UE, or both. In some examples, the beam component 1235 may receive a first beam modification response message from the first peer UE using the first TRP of the UE or a second beam modification response message from the second peer UE using the second TRP of the UE, or both, based on the first beam modification request message or the second beam modification request message, or both. In some examples, the beam component 1235 may transmit the first power control request message or the second power control request message, or both, is based on the first beam modification response message or the second beam modification response message, or both.

In some examples, the beam component 1235 may receive a beam modification request message based on capability information associated with the UE. In some examples, the beam component 1235 may transmit a beam modification response message based on the beam modification request message. In some examples, the beam component 1235 may receive the power control request message is based on the beam modification response message. In some cases, the first beam modification request message or the second beam modification request message, or both, include an indication of a set of directional beams for the first peer UE or the second peer UE, or both, to activate for the sidelink communications.

In some cases, the first beam modification request message or the second beam modification request message, or both, include an indication of a set of directional beams for the first peer UE or the second peer UE, or both, to deactivate for the sidelink communications. In some cases, the first beam modification request message or the second beam modification request message, or both, include an indication of a threshold transmit power value per directional beam for the first peer UE or the second peer UE, or both, for the sidelink communications. In some cases, the first beam modification response message or the second beam modification response message, or both, include an indication of the first peer UE or the second peer UE, or both, accepting or rejecting a set of directional beams for the first peer UE or the second peer UE, or both, for the sidelink communications.

In some cases, the beam modification request message includes an indication of a set of directional beams for the UE to activate for the sidelink communications. In some cases, the beam modification request message includes an indication of a set of directional beams for the UE to deactivate for the sidelink communications. In some cases, the beam modification request message includes an indication of a threshold transmit power value associated with one or more directional beams for the UE to use for the sidelink communications. In some cases, the beam modification response message includes an indication of the UE accepting or rejecting one or more directional beams for the UE to use for the sidelink communications.

Figure 13:
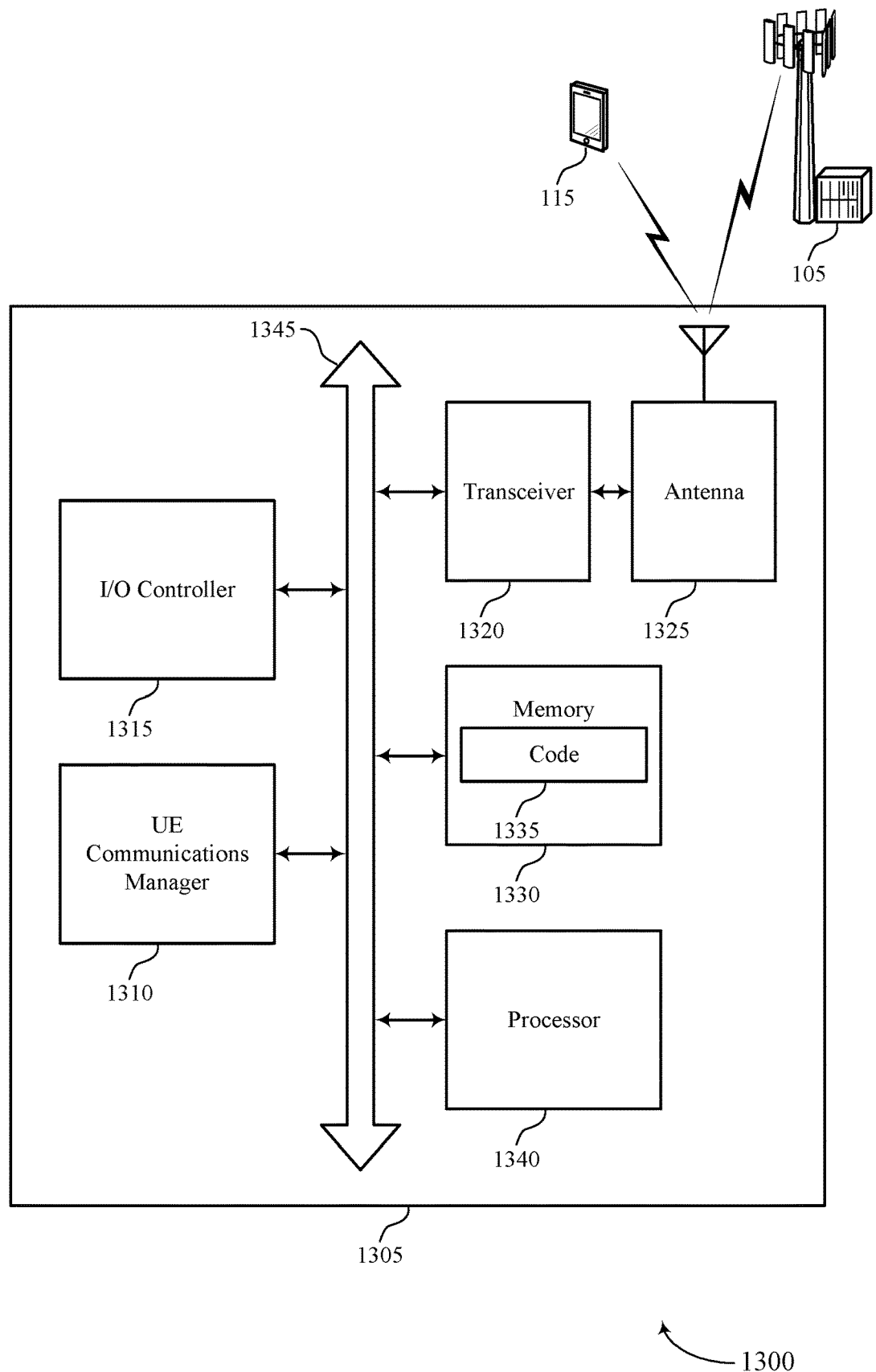
FIG. 13 shows a diagram of a system including a device in accordance with various aspects of the present disclosure.

FIG. 13 shows a diagram of a system 1300 including a device 1305 in accordance with various aspects of the present disclosure. The device 1305 may be an example of or include the components of device 1005, device 1105, or a UE 115 as described herein. The device 1305 may be configured with a single TRP or multiple TRPs as described with reference to FIGS. 1 through 9. The device 1305 may include components for bi-directional voice and data communications including components for transmitting and receiving communications, including a UE communications manager 1310, an I/O controller 1315, a transceiver 1320, an antenna 1325, memory 1330, and a processor 1340. These components may be in electronic communication via one or more buses (e.g., bus 1345).

The UE communications manager 1310 may as described herein may be implemented to realize one or more potential improvements. One implementation may allow the device 1305 to reduce latency for sidelink communications in a wireless communications systems, such as in 5G systems. Another implementation may allow the device 1305 to improve resource utilization for sidelink communications with two or more peer devices by determining time and frequency resources for the two or more peer devices and space-division multiplexing the two or more peer devices over the determined time and frequency resources. Another implementation may allow the device 1305 to mitigate interference for sidelink communications with two or more peer devices by transmitting a power control request message to the two or more peer devices, and receiving a power control response message from the two or more peer devices. The power control request message may indicate a preferred transmit power, a transmit power decrement value, or at transmit power increment value for the two or more peer devices to adjust a transmit power level to avoid interference to other peer devices.

The UE communications manager 1310 may transmit a first power control request message to a first peer UE using a first TRP of at least two TRPs associated with the UE and a second power control request message to a second peer UE using the first TRP or a second TRP of the at least two TRPs associated with the UE, receive, in response to the transmitting, a first power control response message from the first peer UE using the first TRP of the UE and a second power control response message from the second peer UE using the first TRP or the second TRP of the UE, and determine time and frequency resources for the sidelink communications with the first peer UE and the second peer UE based on the received first power control response message and the received second power control response message.

The UE communications manager 1310 may also receive a power control request message from a peer UE, the power control request message including an indication of a transmit power value for the UE, the peer UE having multiple TRPs, transmit, based on the receiving, a power control response message from the peer UE, and transmit the sidelink communications to the peer UE according to the transmit power value.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas. In some cases, the device 1305 may include a single antenna 1325. However, in some cases, the device 1305 may have more than one antenna 1325, which may be capable of concurrently transmitting or receiving multiple wireless transmissions.

The memory 1330 may include random-access memory (RAM) and read-only memory (ROM). The memory 1330 may store computer-readable, computer-executable code 1335 including instructions that, when executed, cause the processor to perform various functions described herein. In some cases, the memory 1330 may contain, among other things, a basic input/output system (BIOS) which may control basic hardware or software operation such as the interaction with peripheral components or devices.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for determining sidelink resources for multiple TRPs enabled user equipments).

Figure 14:
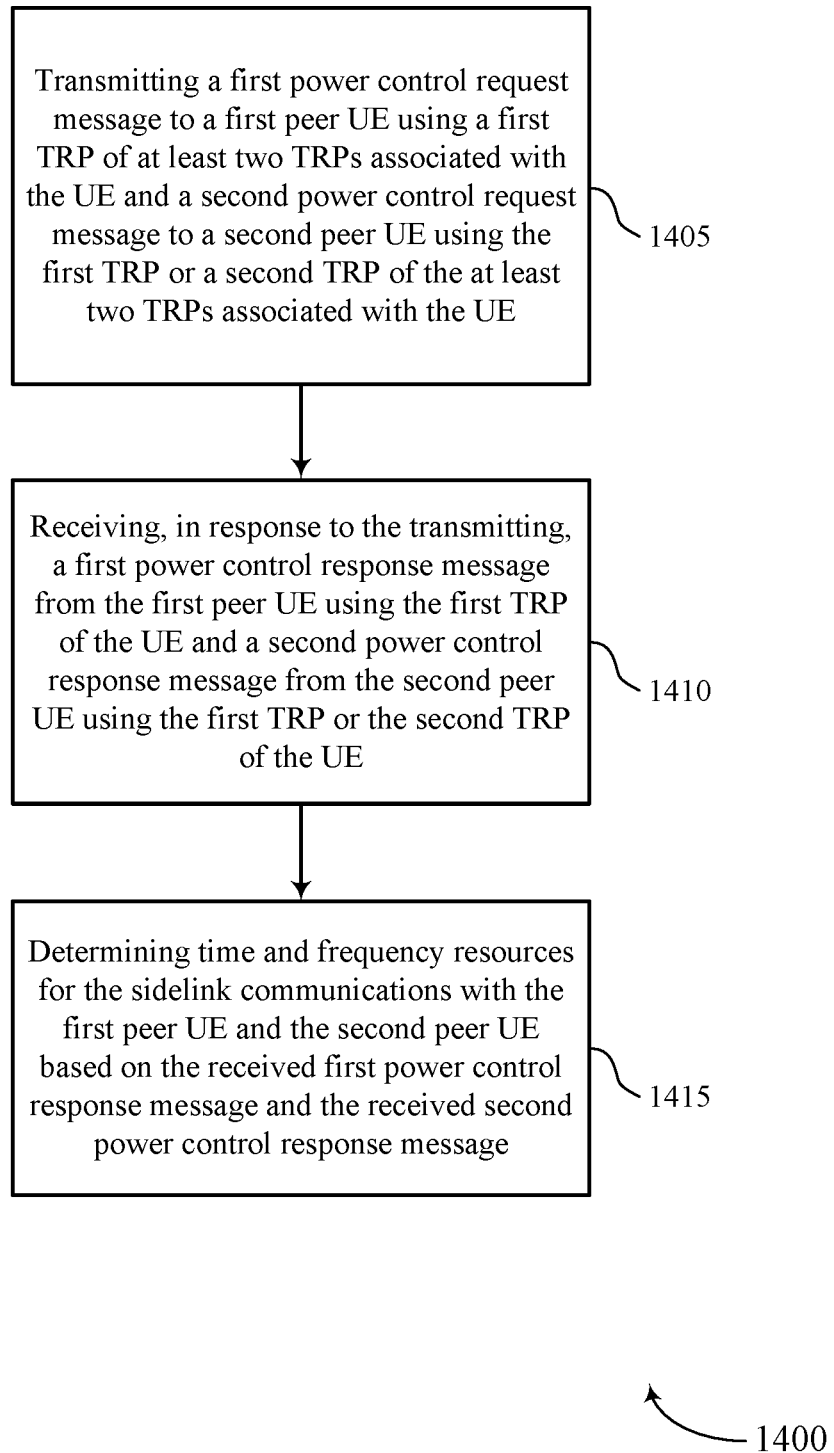
FIGS. 14 through 17 show flowcharts illustrating methods in accordance with various aspects of the present disclosure.

FIG. 14 shows a flowchart illustrating a method 1400 in accordance with various aspects of the present disclosure. The operations of method 1400 may be implemented by a UE 115 or its components as described herein. The UE 115 may be configured with a single TRP or multiple TRPs as described with reference to FIGS. 1 through 9. The operations of method 1400 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1405, the UE may transmit a first power control request message to a first peer UE using a first TRP of at least two TRPs associated with the UE and a second power control request message to a second peer UE using the first TRP or a second TRP of the at least two TRPs associated with the UE. The operations of 1405 may be performed according to the methods described herein. In some examples, aspects of the operations of 1405 may be performed by a power component as described with reference to FIGS. 10 through 13.

At 1410, the UE may receive, in response to the transmitting, a first power control response message from the first peer UE using the first TRP of the UE and a second power control response message from the second peer UE using the first TRP or the second TRP of the UE. The operations of 1410 may be performed according to the methods described herein. In some examples, aspects of the operations of 1410 may be performed by a power component as described with reference to FIGS. 10 through 13.

At 1415, the UE may determine time and frequency resources for the sidelink communications with the first peer UE and the second peer UE based on the received first power control response message and the received second power control response message. The operations of 1415 may be performed according to the methods described herein. In some examples, aspects of the operations of 1415 may be performed by a resource component as described with reference to FIGS. 10 through 13.

Figure 15:
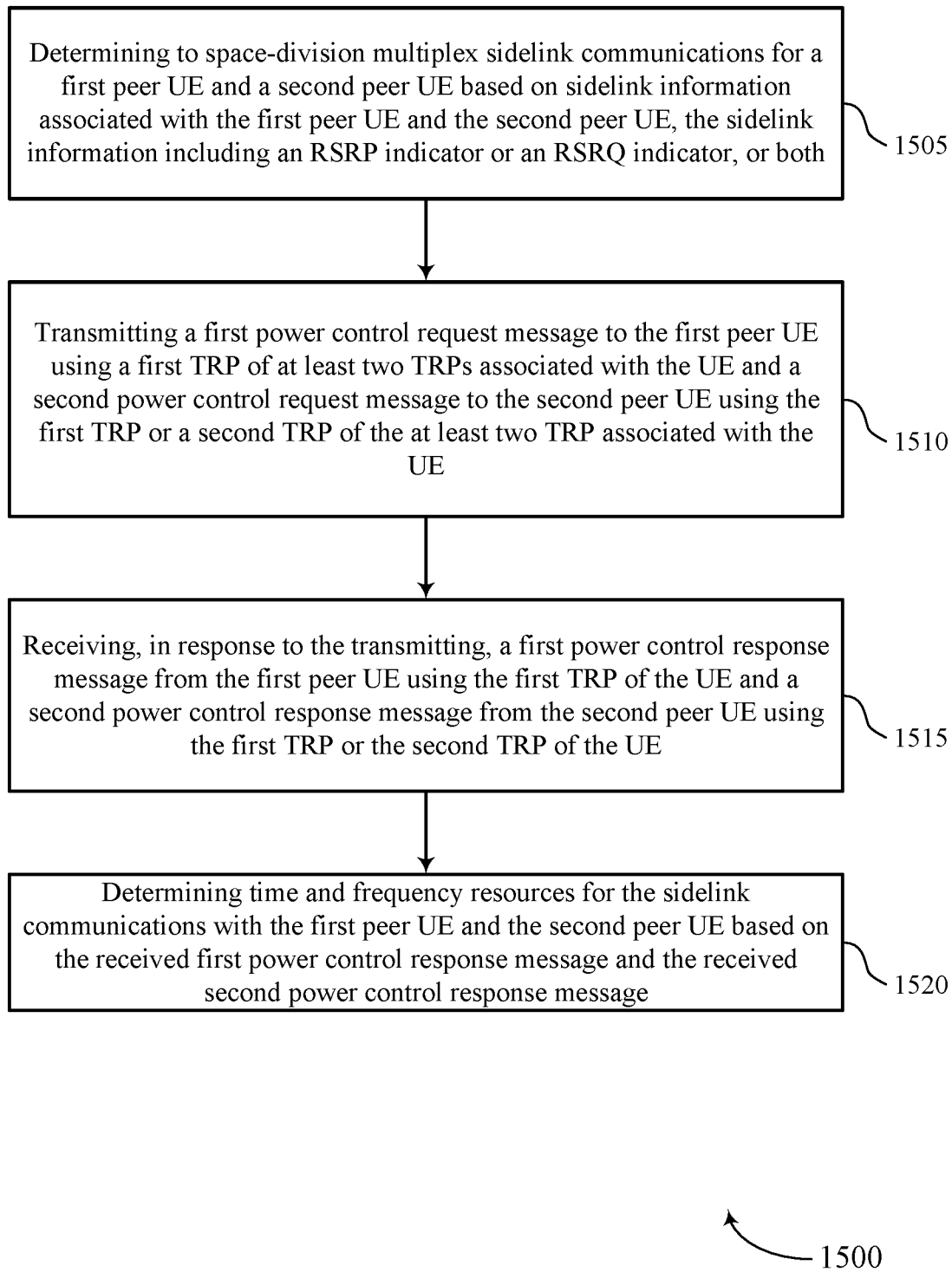

FIG. 15 shows a flowchart illustrating a method 1500 in accordance with various aspects of the present disclosure. The operations of method 1500 may be implemented by a UE 115 or its components as described herein. The UE 115 may be configured with a single TRP or multiple TRPs as described with reference to FIGS. 1 through 9. The operations of method 1500 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1505, the UE may determine to space-division multiplex sidelink communications for a first peer UE and a second peer UE based on sidelink information associated with the first peer UE and the second peer UE, the sidelink information including an RSRP indicator or an RSRQ indicator, or both. The operations of 1505 may be performed according to the methods described herein. In some examples, aspects of the operations of 1505 may be performed by a multiplex component as described with reference to FIGS. 10 through 13.

At 1510, the UE may transmit a first power control request message to the first peer UE using a first TRP of at least two TRPs associated with the UE and a second power control request message to the second peer UE using the first TRP or a second TRP of the at least two TRPs associated with the UE. The operations of 1510 may be performed according to the methods described herein. In some examples, aspects of the operations of 1510 may be performed by a power component as described with reference to FIGS. 10 through 13.

At 1515, the UE may receive, in response to the transmitting, a first power control response message from the first peer UE using the first TRP of the UE and a second power control response message from the second peer UE using the first TRP or the second TRP of the UE. The operations of 1515 may be performed according to the methods described herein. In some examples, aspects of the operations of 1515 may be performed by a power component as described with reference to FIGS. 10 through 13.

At 1520, the UE may determine time and frequency resources for the sidelink communications with the first peer UE and the second peer UE based on the received first power control response message and the received second power control response message. The operations of 1520 may be performed according to the methods described herein. In some examples, aspects of the operations of 1520 may be performed by a resource component as described with reference to FIGS. 10 through 13.

Figure 16:
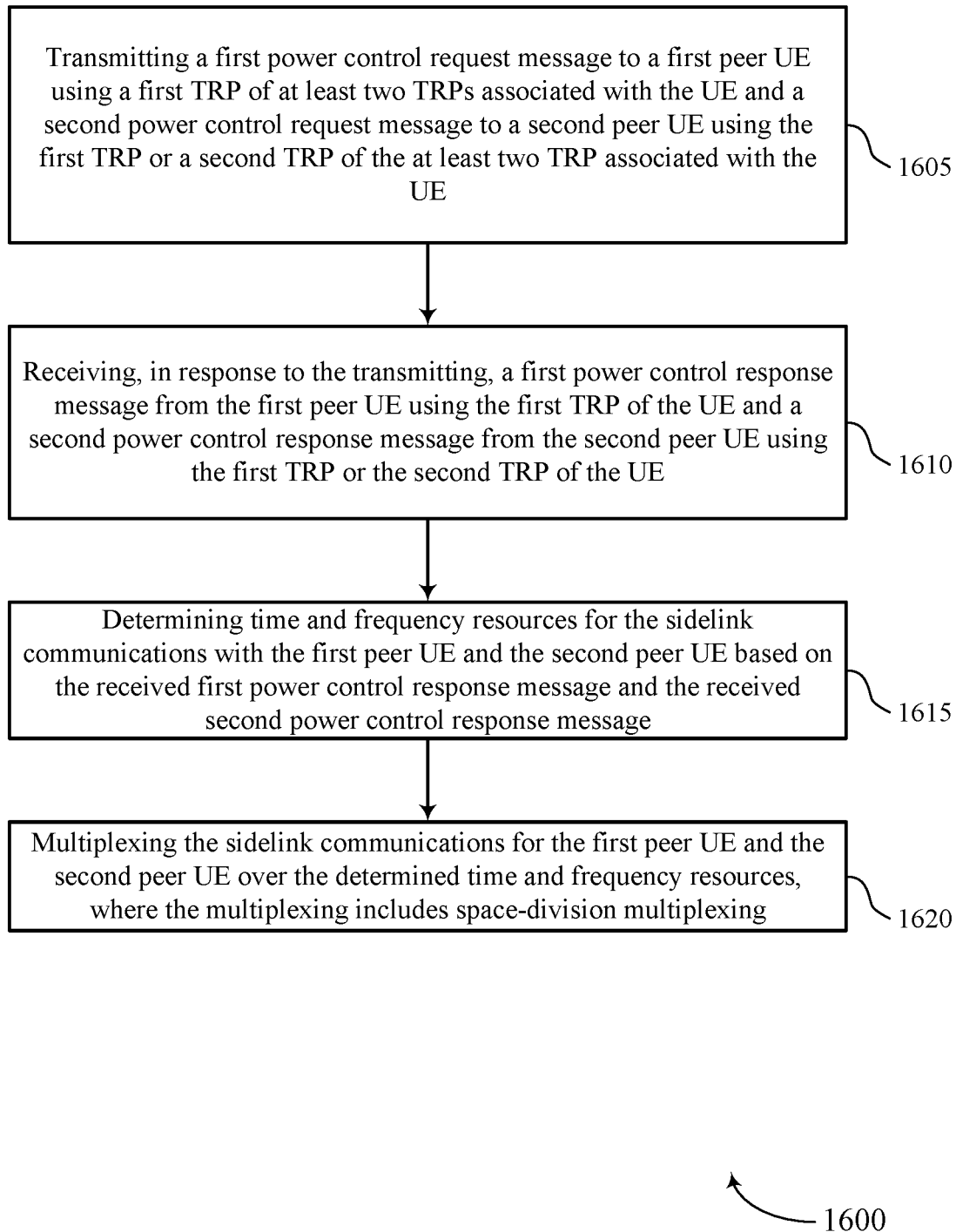

FIG. 16 shows a flowchart illustrating a method 1600 in accordance with various aspects of the present disclosure. The operations of method 1600 may be implemented by a UE 115 or its components as described herein. The UE 115 may be configured with a single TRP or multiple TRPs as described with reference to FIGS. 1 through 9. The operations of method 1600 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1605, the UE may transmit a first power control request message to a first peer UE using a first TRP of at least two TRPs associated with the UE and a second power control request message to a second peer UE using the first TRP or a second TRP of the at least two TRPs associated with the UE. The operations of 1605 may be performed according to the methods described herein. In some examples, aspects of the operations of 1605 may be performed by a power component as described with reference to FIGS. 10 through 13.

At 1610, the UE may receive, in response to the transmitting, a first power control response message from the first peer UE using the first TRP of the UE and a second power control response message from the second peer UE using the first TRP or the second TRP of the UE. The operations of 1610 may be performed according to the methods described herein. In some examples, aspects of the operations of 1610 may be performed by a power component as described with reference to FIGS. 10 through 13.

At 1615, the UE may determine time and frequency resources for the sidelink communications with the first peer UE and the second peer UE based on the received first power control response message and the received second power control response message. The operations of 1615 may be performed according to the methods described herein. In some examples, aspects of the operations of 1615 may be performed by a resource component as described with reference to FIGS. 10 through 13.

At 1620, the UE may multiplex the sidelink communications for the first peer UE and the second peer UE over the determined time and frequency resources, where the multiplexing includes space-division multiplexing. The operations of 1620 may be performed according to the methods described herein. In some examples, aspects of the operations of 1620 may be performed by a multiplex component as described with reference to FIGS. 10 through 13.

Figure 17:
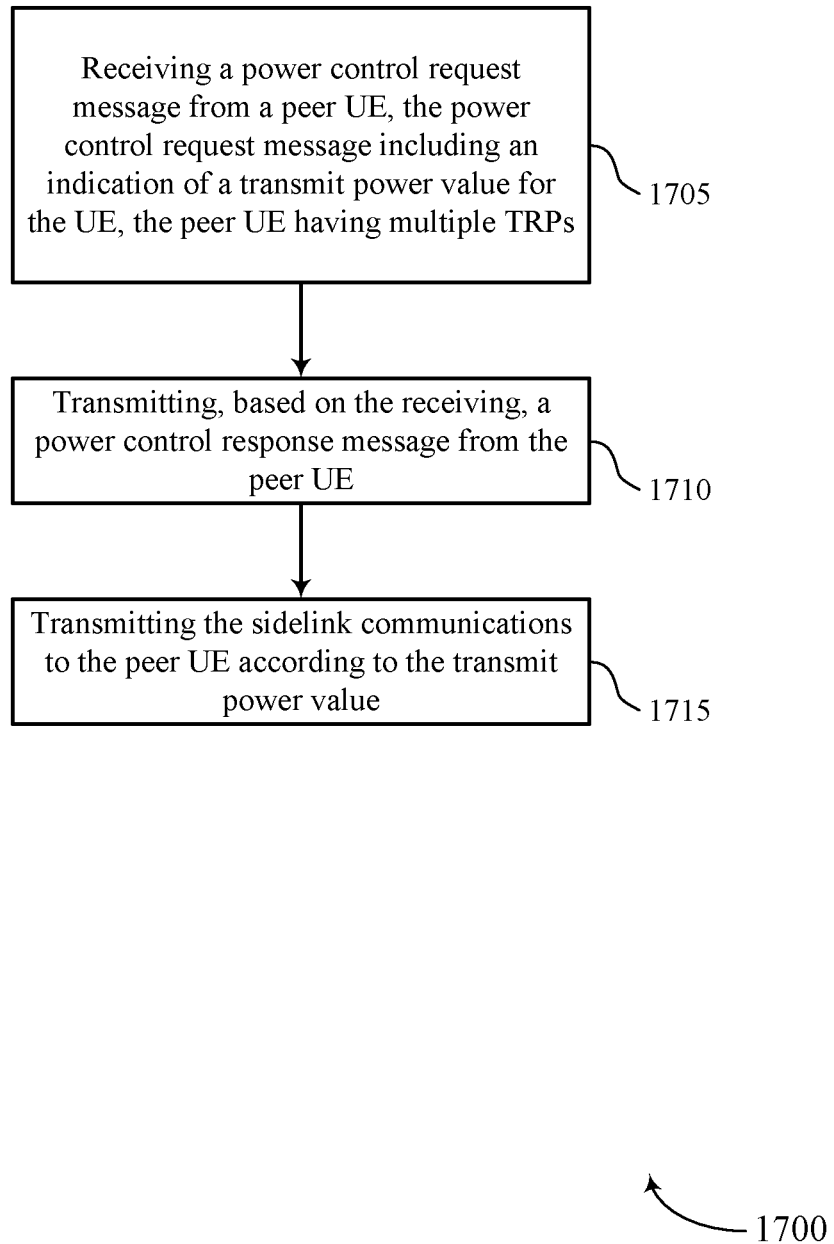

FIG. 17 shows a flowchart illustrating a method 1700 in accordance with various aspects of the present disclosure. The operations of method 1700 may be implemented by a UE 115 or its components as described herein. The UE 115 may be configured with a single TRP or multiple TRPs as described with reference to FIGS. 1 through 9. The operations of method 1700 may be performed by a UE communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1705, the UE may receive a power control request message from a peer UE, the power control request message including an indication of a transmit power value for the UE, the peer UE having multiple TRPs. The operations of 1705 may be performed according to the methods described herein. In some examples, aspects of the operations of 1705 may be performed by a power component as described with reference to FIGS. 10 through 13.

At 1710, the UE may transmit, based on the receiving, a power control response message from the peer UE. The operations of 1710 may be performed according to the methods described herein. In some examples, aspects of the operations of 1710 may be performed by a power component as described with reference to FIGS. 10 through 13.

At 1715, the UE may transmit the sidelink communications to the peer UE according to the transmit power value. The operations of 1715 may be performed according to the methods described herein. In some examples, aspects of the operations of 1715 may be performed by a sidelink component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for sidelink communications at a UE, wherein: transmitting a first power control request message to a first peer UE using a first TRP of at least two TRP s associated with the UE and a second power control request message to a second peer UE using the first TRP or a second TRP of the at least two TRP s associated with the UE; receiving, in response to the transmitting, a first power control response message from the first peer UE using the first TRP of the UE and a second power control response message from the second peer UE using the first TRP or the second TRP of the UE; and determining time and frequency resources for the sidelink communications with the first peer UE and the second peer UE based at least in part on the received first power control response message and the received second power control response message.

Aspect 2: The method of aspect 1, wherein the first power control request message and the second power control request message comprise a transmit power parameter to adjust a transmit power value of the first peer UE and the second peer UE.

Aspect 3: The method of any of aspects 1 through 2, further comprising: determining to space-division multiplex the sidelink communications for the first peer UE and the second peer UE based at least in part on sidelink information associated with the first peer UE and the second peer UE, the sidelink information comprising an RSRP indicator or an RSRQ indicator, or both.

Aspect 4: The method of any of aspects 1 through 3, further comprising: multiplexing the sidelink communications for the first peer UE and the second peer UE over the determined time and frequency resources, wherein the multiplexing comprises space-division multiplexing.

Aspect 5: The method of any of aspects 1 through 4, further comprising: determining a first transmit power value for the first peer UE and a second transmit power value for the second peer UE based at least in part on sidelink information associated with the first peer UE and the second peer UE, wherein the first transmit power value is different from the second transmit power value.

Aspect 6: The method of aspect 5, wherein the first power control request message comprises a first indication of the first transmit power value and the second power control request message comprises a second indication of the second transmit power value.

Aspect 7: The method of any of aspects 5 through 6, further comprising: determining that the first peer UE accepts the first transmit power value and the second peer UE accepts the second transmit power value based at least in part on the first power control response message and the second power control response message, wherein determining the time and frequency resources for the sidelink communications with the first peer UE and the second peer UE is based at least in part on the first peer UE accepting the first transmit power value and the second peer UE accepting the second transmit power value.

Aspect 8: The method of any of aspects 5 through 7, further comprising: transmitting first SCI to the first peer UE using the first TRP of the UE and second SCI to the second peer UE using the second TRP of the UE based at least in part on the first power control response message indicating the first peer UE accepting the first transmit power value and the second power control response message indicating the second peer UE accepting the second transmit power value.

Aspect 9: The method of any of aspects 5 through 8, further comprising: transmitting a first MCS request message to the second peer UE using the second TRP of the UE based at least in part on the first power control response message indicating the first peer UE rejecting the first transmit power value and the second power control response message indicating the second peer UE accepting the second transmit power value, wherein the first MCS request message comprises a first MCS restriction; and receiving a first MCS response message from the second peer UE using the second TRP of the UE based at least in part on the first MCS request message.

Aspect 10: The method of aspect 9, further comprising: transmitting a third power control request message to the first peer UE using the first TRP of the UE based at least in part on the first MCS response message indicating the second peer UE accepting the first MCS restriction; and receiving a third power control response message from the first peer UE using the first TRP of the UE based at least in part on the third power control request message.

Aspect 11: The method of aspect 10, wherein the third power control request message comprises a third indication of a third transmit power value different from the first transmit power value.

Aspect 12: The method of any of aspects 10 through 11, further comprising: transmitting a second MCS request message to the second peer UE using the second TRP of the UE based at least in part on the third power control response message indicating the first peer UE rejecting the third transmit power value, wherein the second MCS request message comprises a second MCS restriction different from the first MCS restriction; and receiving a second MCS response message from the second peer UE using the second TRP of the UE based at least in part on the second MCS request message.

Aspect 13: The method of aspect 12, further comprising: determining the first MCS restriction or the second MCS restriction, or both, based at least in part on the sidelink information associated with the first peer UE and the second peer UE.

Aspect 14: The method of any of aspects 5 through 13, further comprising: determining that the first peer UE accepts the first transmit power value and the second peer UE rejects the second transmit power value based at least in part on the first power control response message and the second power control response message; determining a third transmit power value different from the second transmit power value based at least in part on the second peer UE rejecting the second transmit power value; and retransmitting the second power control request message to the second peer UE using the second TRP of the UE based at least in part on the second power control response message indicating the second peer UE rejecting the second transmit power value, wherein the retransmitted second power control request message comprises an indication of the third transmit power value.

Aspect 15: The method of aspect 14, wherein determining the third transmit power value comprises: updating the second transmit power value by a transmit power adjustment value.

Aspect 16: The method of any of aspects 14 through 15, further comprising: determining that the third transmit power value satisfies a threshold associated with the second peer UE, wherein retransmitting the second power control request message comprising the indication of the third transmit power value is based at least in part on the third transmit power value satisfying the threshold associated with the second peer UE.

Aspect 17: The method of any of aspects 14 through 16, further comprising: determining a MCS restriction for the first peer UE based at least in part on receiving a third power control response message indicating the second peer UE accepting the third transmit power value.

Aspect 18: The method of aspect 17, further comprising: transmitting a MCS request message to the first peer UE using the first TRP of the UE, wherein the MCS request message comprises an indication of the MCS restriction; and receiving a MCS response message from the first peer UE using the first TRP of the UE based at least in part on the MCS request message, wherein determining the time and frequency resources for the sidelink communications with the first peer UE and the second peer UE is based at least in part on the first peer UE accepting the MCS restriction and the second peer UE accepting the third transmit power value.

Aspect 19: The method of any of aspects 1 through 18, further comprising: transmitting a first beam modification request message to the first peer UE using the first TRP of the UE or a second beam modification request message to the second peer UE using the second TRP of the UE, or both, based at least in part on first capability information associated with the first peer UE or second capability information associated with the second peer UE, or both; and receiving a first beam modification response message from the first peer UE using the first TRP of the UE or a second beam modification response message from the second peer UE using the second TRP of the UE, or both, based at least in part on the first beam modification request message or the second beam modification request message, or both.

Aspect 20: The method of aspect 19, wherein transmitting the first power control request message or the second power control request message, or both, is based at least in part on the first beam modification response message or the second beam modification response message, or both.

Aspect 21: The method of any of aspects 19 through 20, wherein the first beam modification request message or the second beam modification request message, or both, comprise an indication of a set of directional beams for the first peer UE or the second peer UE, or both, to activate for the sidelink communications.

Aspect 22: The method of any of aspects 19 through 21, wherein the first beam modification request message or the second beam modification request message, or both, comprise an indication of a set of directional beams for the first peer UE or the second peer UE, or both, to deactivate for the sidelink communications.

Aspect 23: The method of any of aspects 19 through 22, wherein the first beam modification request message or the second beam modification request message, or both, comprise an indication of a threshold transmit power value per directional beam for the first peer UE or the second peer UE, or both, for the sidelink communications.

Aspect 24: The method of any of aspects 19 through 23, wherein the first beam modification response message or the second beam modification response message, or both, comprise an indication of the first peer UE or the second peer UE, or both, accepting or rejecting a set of directional beams for the first peer UE or the second peer UE, or both, for the sidelink communications.

Aspect 25: The method of any of aspects 1 through 24, wherein the first TRP is different from the second TRP.

Aspect 26: The method of any of aspects 1 through 25, wherein the determined time and frequency resources comprise same time and frequency resource blocks.

Aspect 27: A method for sidelink communications at a UE, comprising: receiving a power control request message from a peer UE, the power control request message comprising an indication of a transmit power value for the UE, the peer UE having multiple TRP s; transmitting, based at least in part on the receiving, a power control response message from the peer UE; and transmitting the sidelink communications to the peer UE according to the transmit power value.

Aspect 28: The method of aspect 27, further comprising: setting a transmit power level of the UE based at least in part on the transmit power value indicated in the power control request message.

Aspect 29: The method of any of aspects 27 through 28, further comprising: receiving SCI from the peer UE based at least in part on the power control response message indicating the UE accepting the transmit power value.

Aspect 30: The method of any of aspects 27 through 29, further comprising: receiving a MCS request message based at least in part on the power control response message indicating the UE rejecting the transmit power value, wherein the MCS request message comprises a MCS restriction; and transmitting a MCS response message based at least in part on the MCS request message.

Aspect 31: The method of any of aspects 27 through 30, further comprising: receiving a beam modification request message based at least in part on capability information associated with the UE; and transmitting a beam modification response message based at least in part on the beam modification request message.

Aspect 32: The method of aspect 31, wherein receiving the power control request message is based at least in part on the beam modification response message.

Aspect 33: The method of any of aspects 31 through 32, wherein the beam modification request message comprises an indication of a set of directional beams for the UE to activate for the sidelink communications.

Aspect 34: The method of any of aspects 31 through 33, wherein the beam modification request message comprises an indication of a set of directional beams for the UE to deactivate for the sidelink communications.

Aspect 35: The method of any of aspects 31 through 34, wherein the beam modification request message comprises an indication of a threshold transmit power value associated with one or more directional beams for the UE to use for the sidelink communications.

Aspect 36: The method of any of aspects 31 through 35, wherein the beam modification response message comprises an indication of the UE accepting or rejecting one or more directional beams for the UE to use for the sidelink communications.

Aspect 37: An apparatus for sidelink communications at a UE, comprising a processor; memory coupled with the processor; and instructions stored in the memory and executable by the processor to cause the apparatus to perform a method of any of aspects 1 through 26.

Aspect 38: An apparatus for sidelink communications at a UE, comprising at least one means for performing a method of any of aspects 1 through 26.

Aspect 39: A non-transitory computer-readable medium storing code for sidelink communications at a UE, the code comprising instructions executable by a processor to perform a method of any of aspects 1 through 26.

Aspect 40: An apparatus for sidelink communications at a UE, comprising a processor; memory coupled with the processor; and instructions stored in the memory and executable by the processor to cause the apparatus to perform a method of any of aspects 27 through 36.

Aspect 41: An apparatus for sidelink communications at a UE, comprising at least one means for performing a method of any of aspects 27 through 36.

Aspect 42: A non-transitory computer-readable medium storing code for sidelink communications at a UE, the code comprising instructions executable by a processor to perform a method of any of aspects 27 through 36.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for sidelink communications at a user equipment (UE), comprising:

transmitting a first power control request message to a first peer UE using a first transmission and reception point of at least two transmission and reception points associated with the UE and a second power control request message to a second peer UE using the first transmission and reception point or a second transmission and reception point of the at least two transmission and reception points associated with the UE;

receiving, in response to the transmitting, a first power control response message from the first peer UE using the first transmission and reception point of the UE and a second power control response message from the second peer UE using the first transmission and reception point or the second transmission and reception point of the UE; and determining time and frequency resources for the sidelink communications with the first peer UE and the second peer UE based at least in part on the received first power control response message, the received second power control response message, and a resource grid, wherein the resource grid is associated with the first transmission and reception point of the UE, the second transmission and reception point of the UE, or both.

2. The method of claim 1, wherein the first power control request message and the second power control request message comprise a transmit power parameter to adjust a transmit power value of the first peer UE and the second peer UE.

3. The method of claim 1, further comprising:
determining to space-division multiplex the sidelink communications for the first peer UE and the second peer UE based at least in part on sidelink information associated with the first peer UE and the second peer UE, the sidelink information comprising a reference signal received power indicator or a reference signal received quality indicator, or both.

4. The method of claim 1, further comprising:
multiplexing the sidelink communications for the first peer UE and the second peer UE over the determined time and frequency resources, wherein the multiplexing comprises space-division multiplexing.

5. The method of claim 1, further comprising:
determining a first transmit power value for the first peer UE and a second transmit power value for the second peer UE based at least in part on sidelink information associated with the first peer UE and the second peer UE, wherein the first transmit power value is different from the second transmit power value.

6. The method of claim 5, wherein the first power control request message comprises a first indication of the first transmit power value and the second power control request message comprises a second indication of the second transmit power value.

7. The method of claim 5, further comprising:
determining that the first peer UE accepts the first transmit power value and the second peer UE accepts the second transmit power value based at least in part on the first power control response message and the second power control response message,
wherein determining the time and frequency resources for the sidelink communications with the first peer UE and the second peer UE is based at least in part on the first peer UE accepting the first transmit power value and the second peer UE accepting the second transmit power value.

8. The method of claim 5, further comprising:
transmitting first sidelink control information to the first peer UE using the first transmission and reception point of the UE and second sidelink control information to the second peer UE using the second transmission and reception point of the UE based at least in part on the first power control response message indicating the first peer UE accepting the first transmit power value and the second power control response message indicating the second peer UE accepting the second transmit power value.

9. The method of claim 5, further comprising:
transmitting a first modulation and coding scheme request message to the second peer UE using the second transmission and reception point of the UE based at least in part on the first power control response message indicating the first peer UE rejecting the first transmit power value and the second power control response message indicating the second peer UE accepting the second transmit power value, wherein the first modulation and coding scheme request message comprises a first modulation and coding scheme restriction; and
receiving a first modulation and coding scheme response message from the second peer UE using the second transmission and reception point of the UE based at least in part on the first modulation and coding scheme request message.

10. The method of claim 9, further comprising:
transmitting a third power control request message to the first peer UE using the first transmission and reception point of the UE based at least in part on the first modulation and coding scheme response message indicating the second peer UE accepting the first modulation and coding scheme restriction; and
receiving a third power control response message from the first peer UE using the first transmission and reception point of the UE based at least in part on the third power control request message.

11. The method of claim 10, wherein the third power control request message comprises a third indication of a third transmit power value different from the first transmit power value.

12. The method of claim 10, further comprising:
transmitting a second modulation and coding scheme request message to the second peer UE using the second transmission and reception point of the UE based at least in part on the third power control response message indicating the first peer UE rejecting a third transmit power value, wherein the second modulation and coding scheme request message comprises a second modulation and coding scheme restriction different from the first modulation and coding scheme restriction; and
receiving a second modulation and coding scheme response message from the second peer UE using the second transmission and reception point of the UE based at least in part on the second modulation and coding scheme request message.

13. The method of claim 12, further comprising:
determining the first modulation and coding scheme restriction or the second modulation and coding scheme restriction, or both, based at least in part on the sidelink information associated with the first peer UE and the second peer UE.

14. The method of claim 5, further comprising:
determining that the first peer UE accepts the first transmit power value and the second peer UE rejects the second transmit power value based at least in part on the first power control response message and the second power control response message;
determining a third transmit power value different from the second transmit power value based at least in part on the second peer UE rejecting the second transmit power value; and
retransmitting the second power control request message to the second peer UE using the second transmission and reception point of the UE based at least in part on the second power control response message indicating the second peer UE rejecting the second transmit power value, wherein the retransmitted second power control request message comprises an indication of the third transmit power value.

15. The method of claim 14, wherein determining the third transmit power value comprises:
updating the second transmit power value by a transmit power adjustment value.

16. The method of claim 14, further comprising:
determining that the third transmit power value satisfies a threshold associated with the second peer UE,
wherein retransmitting the second power control request message comprising the indication of the third transmit power value is based at least in part on the third transmit power value satisfying the threshold associated with the second peer UE.

17. The method of claim 14, further comprising:
determining a modulation and coding scheme restriction for the first peer UE based at least in part on receiving a third power control response message indicating the second peer UE accepting the third transmit power value.

18. The method of claim 17, further comprising:
transmitting a modulation and coding scheme request message to the first peer UE using the first transmission and reception point of the UE, wherein the modulation and coding scheme request message comprises an indication of the modulation and coding scheme restriction; and
receiving a modulation and coding scheme response message from the first peer UE using the first transmission and reception point of the UE based at least in part on the modulation and coding scheme request message,
wherein determining the time and frequency resources for the sidelink communications with the first peer UE and the second peer UE is based at least in part on the first peer UE accepting the modulation and coding scheme restriction and the second peer UE accepting the third transmit power value.

19. The method of claim 1, further comprising:
transmitting a first beam modification request message to the first peer UE using the first transmission and reception point of the UE or a second beam modification request message to the second peer UE using the second transmission and reception point of the UE, or both, based at least in part on first capability information associated with the first peer UE or second capability information associated with the second peer UE, or both; and
receiving a first beam modification response message from the first peer UE using the first transmission and reception point of the UE or a second beam modification response message from the second peer UE using the second transmission and reception point of the UE, or both, based at least in part on the first beam modification request message or the second beam modification request message, or both.

20. The method of claim 19, wherein transmitting the first power control request message or the second power control request message, or both, is based at least in part on the first beam modification response message or the second beam modification response message, or both.

21. The method of claim 19, wherein the first beam modification request message or the second beam modification request message, or both, comprise an indication of a set of directional beams for the first peer UE or the second peer UE, or both, to activate for the sidelink communications.

22. The method of claim 19, wherein the first beam modification request message or the second beam modification request message, or both, comprise an indication of a set of directional beams for the first peer UE or the second peer UE, or both, to deactivate for the sidelink communications.

23. The method of claim 19, wherein the first beam modification request message or the second beam modification request message, or both, comprise an indication of a threshold transmit power value per directional beam for the first peer UE or the second peer UE, or both, for the sidelink communications.

24. The method of claim 19, wherein the first beam modification response message or the second beam modification response message, or both, comprise an indication of the first peer UE or the second peer UE, or both, accepting or rejecting a set of directional beams for the first peer UE or the second peer UE, or both, for the sidelink communications.

25. The method of claim 1, wherein the first transmission and reception point is different from the second transmission and reception point.

26. The method of claim 1, wherein the determined time and frequency resources comprise same time and frequency resource blocks.

27. An apparatus for sidelink communication, comprising:
a processor,
memory coupled with the processor; and
instructions stored in the memory and executable by the processor to cause the apparatus to:
transmit a first power control request message to a first peer apparatus using a first transmission and reception point of at least two transmission and reception points associated with the apparatus and a second power control request message to a second peer apparatus using the first transmission and reception point or a second transmission and reception point of the at least two transmission and reception points associated with the apparatus;
receive, in response to the transmitting, a first power control response message from the first peer apparatus using the first transmission and reception point of the apparatus and a second power control response message from the second peer apparatus using the first transmission and reception point or the second transmission and reception point of the apparatus; and
determine time and frequency resources for the sidelink communications with the first peer apparatus and the second peer apparatus based at least in part on the received first power control response message, the received second power control response message, and a resource grid, wherein the resource grid is associated with the first transmission and reception point of the apparatus, the second transmission and reception point of the apparatus, or both.

28. The apparatus of claim 27, wherein the first power control request message and the second power control request message comprise a transmit power parameter to adjust a transmit power value of the first peer apparatus and the second peer apparatus.

29. An apparatus for sidelink communications, comprising:
means for transmitting a first power control request message to a first peer apparatus using a first transmission and reception point of at least two transmission and reception points associated with the apparatus and a second power control request message to a second peer apparatus using the first transmission and reception point or a second transmission and reception point of the at least two transmission and reception points associated with the apparatus;
means for receiving, in response to the transmitting, a first power control response message from the first peer apparatus using the first transmission and reception point of the apparatus and a second power control response message from the second peer apparatus using the first transmission and reception point or the second transmission and reception point of the apparatus; and
means for determining time and frequency resources for the sidelink communications with the first peer apparatus and the second peer apparatus based at least in part on the received first power control response message, the received second power control response message, and a resource grid, wherein the resource grid is associated with the first transmission and reception point of the apparatus, the second transmission and reception point of the apparatus, or both.

30. A non-transitory computer-readable medium storing code for sidelink communications at a user equipment (UE), the code comprising instructions executable by a processor to:

transmit a first power control request message to a first peer UE using a first transmission and reception point of at least two transmission and reception points associated with the UE and a second power control request message to a second peer UE using the first transmission and reception point or a second transmission and reception point of the at least two transmission and reception points associated with the UE;

receive, in response to the transmitting, a first power control response message from the first peer UE using the first transmission and reception point of the UE and a second power control response message from the second peer UE using the first transmission and reception point or the second transmission and reception point of the UE; and determine time and frequency resources for the sidelink communications with the first peer UE and the second peer UE based at least in part on the received first power control response message, the received second power control response message, and a resource grid, wherein the resource grid is associated with the first transmission and reception point of the UE, the second transmission and reception point of the UE, or both.

* * * * *